United States Patent
Bowers et al.

(10) Patent No.: US 10,088,874 B2
(45) Date of Patent: Oct. 2, 2018

(54) CAPTURE CONNECTOR FOR ACTUATED LOCKING DEVICES

(71) Applicant: Microsoft Technology Licensing, LLC, Redmond, WA (US)

(72) Inventors: Scott Douglas Bowers, Woodinville, WA (US); Justin Carl Lind, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/719,293

(22) Filed: Sep. 28, 2017

(65) Prior Publication Data

US 2018/0052495 A1    Feb. 22, 2018

Related U.S. Application Data

(63) Continuation of application No. 15/240,866, filed on Aug. 18, 2016, now Pat. No. 9,785,196.

(51) Int. Cl.
G06F 1/16    (2006.01)

(52) U.S. Cl.
CPC .......... *G06F 1/1679* (2013.01); *G06F 1/1616* (2013.01)

(58) Field of Classification Search
CPC combination set(s) only.
See application file for complete search history.

(56) References Cited

U.S. PATENT DOCUMENTS

| | | | |
|---|---|---|---|
| 4,841,283 A * | 6/1989 | Bubliewicz | E05D 11/00 200/61.7 |
| 4,969,835 A | 11/1990 | Kobayashi et al. | |
| 5,564,936 A | 10/1996 | David et al. | |
| 5,831,820 A | 11/1998 | Huang | |
| 5,990,777 A | 11/1999 | Whiteman, Jr. | |
| 6,133,816 A | 10/2000 | Barnes et al. | |

(Continued)

FOREIGN PATENT DOCUMENTS

WO    9821640 A1    5/1998

OTHER PUBLICATIONS

"International Search Report and Written Opinion Issued in PCT Application No. PCT/US2017/046456", dated Oct. 25, 2017, 12 Pages.

(Continued)

*Primary Examiner* — Lisa Lea Edmonds
(74) *Attorney, Agent, or Firm* — Arent Fox LLP

(57) ABSTRACT

Aspects described herein generally relate to a capture connector an actuated locking device. The actuator mechanism includes a capture connector having a body and at least one contact element connectable to the body, wherein each contact element comprises a first contact surface extending in a first direction and a second contact surface extending in a second direction different from the first direction. The actuator mechanism further includes a shape memory wire extending in a third direction adjacent to the capture connector, and at least one termination component fixedly coupled to the shape memory wire. The shape memory wire has at least one of a first actuation state and a second actuation state, and in the first actuation state, the shape memory wire generates an actuator force in the third direction, which is normal or oblique to the first direction of the first contact surface.

20 Claims, 14 Drawing Sheets

(56) References Cited

U.S. PATENT DOCUMENTS

| | | | |
|---|---|---|---|
| 6,917,276 B1 | 7/2005 | Menard et al. | |
| 6,940,031 B2 | 9/2005 | Uehira | |
| 7,042,714 B2* | 5/2006 | Hillman | F16M 11/10 310/237 |
| 7,133,280 B2* | 11/2006 | Love | G06F 1/162 361/679.07 |
| 7,209,344 B2* | 4/2007 | Hillman | F16M 11/08 248/917 |
| 7,451,595 B2 | 11/2008 | Komori et al. | |
| 8,117,938 B2 | 2/2012 | Mitteer | |
| 8,827,331 B2* | 9/2014 | Corcoran | G11B 33/125 292/336.3 |
| 8,867,203 B2* | 10/2014 | Katsuta | E05B 73/0082 361/679.01 |
| 9,646,179 B1* | 5/2017 | Munns | G06F 21/83 |
| 9,740,245 B2* | 8/2017 | Gault | G06F 1/1635 |
| 9,910,463 B1* | 3/2018 | Bowers | G06F 1/1679 |
| 2002/0069483 A1* | 6/2002 | Savolainen | G06F 1/1616 16/308 |
| 2005/0207104 A1 | 9/2005 | Love | |
| 2007/0150764 A1* | 6/2007 | Chen | G06F 1/1616 713/300 |
| 2012/0180474 A1 | 7/2012 | Matsuki | |
| 2012/0308294 A1 | 12/2012 | Corcoran et al. | |
| 2014/0126126 A1* | 5/2014 | Chuang | G06F 1/1626 361/679.01 |
| 2014/0339265 A1 | 11/2014 | Marone et al. | |
| 2015/0018041 A1 | 1/2015 | Gorilovsky et al. | |
| 2015/0055289 A1* | 2/2015 | Chang | G06F 1/1632 361/679.43 |
| 2015/0116926 A1* | 4/2015 | Robinson | G06F 1/1632 361/679.43 |
| 2015/0285229 A1 | 10/2015 | Nicolini et al. | |
| 2015/0346507 A1 | 12/2015 | Howarth | |
| 2016/0062411 A1* | 3/2016 | Morrison | G06F 1/1632 361/679.08 |

OTHER PUBLICATIONS

"Notice of Allowance Issued in U.S. Appl. No. 15/240,866", dated Jun. 7, 2017, 9 Pages.

Lungu, et al., "Docking Mechanism Actuated by Shape Memory Alloy Actuator", In Proceedings of the 7th France Japan Congress on Mechatronics, May 21, 2008, 4 Pages.

* cited by examiner

CAPTURE CONNECTOR FOR ACTUATED LOCKING DEVICES

CROSS-REFERENCE TO RELATED APPLICATION(S)

This application is a continuation of U.S. patent application Ser. No. 15/240,866, titled "CAPTURE CONNECTOR FOR ACTUATED LOCKING DEVICES," filed on Aug. 18, 2016, the disclosure of which is expressly incorporated by reference herein in their entirety.

BACKGROUND

Use of computing devices is becoming more ubiquitous by the day. Computing devices range from standard desktop computers to wearable computing technology and beyond. One area of computing devices that has grown in recent years is in hybrid computers. Hybrid computers may act as a tablet computer or a laptop computer, and may include input devices that may be coupled to or separated from (e.g., removably attached to) a display portion, where the display portion may also include other components that facilitate operation of the computer (e.g., processor, memory, etc.). These computers often include one or a series of locking mechanisms to allow for attaching and/or detaching a housing of the input device to/from a housing of the display portion. The locking mechanism assures that, when attached, an interface connection between the input device and the display portion remains in sufficient electrical contact to allow communication between the input device and the display portion. Due to their extensive use and because of the mechanical nature of some of their components, existing actuator mechanisms are typically prone to inefficiencies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an actuator mechanism is provided that includes a capture connector having a body, and at least one contact element connectable to the body, wherein each contact element comprises a first contact surface extending in a first direction and a second contact surface extending in a second direction different from the first direction. The actuator mechanism may further include a shape memory wire extending in a third direction adjacent to the capture connector, wherein the shape memory wire has at least one of a first actuation state and a second actuation state, wherein in the first actuation state the shape memory wire has a contracted shape corresponding to moving from a first material phase to a second material phase, and wherein in the second actuation state the shape memory wire has an expanded shape corresponding to moving from the second material phase to the first material phase. The actuator mechanism further includes at least one termination component fixedly coupled to the shape memory wire, wherein the termination component comprises a termination surface shaped for electrical contact with the first contact surface of a respective contact element. Further, in at least one of the first actuation state and the second actuation state, the shape memory wire generates an actuator force such that the termination surface of the at least one termination component transfers at least part of the actuator force in the third direction to the first contact surface of the at least one contact element, wherein the third direction is divergent from the first direction.

In another example, a computing device is provided that includes a first portion having a first set of computing components, a second portion having a second set of computing components that is removably attachable to the first portion. The computing device may further include a locking mechanism having a locked state and an unlocked state. The locked state corresponds to a fixed attachment of the first portion and the second portion. The unlocked state corresponds to a release of the fixed attachment of the first portion and the second portion. The computing device further includes an actuator mechanism having a first actuation state and a second actuation state each corresponding to one of the locked state and the unlocked state. The actuator mechanism includes a capture connector having a body, at least one contact element connectable to the body, wherein each contact element comprises a first contact surface extending in a first direction and a second contact surface extending in a second direction different from the first direction. The actuator mechanism further includes a shape memory wire extending in a third direction adjacent to the capture connector, wherein the shape memory wire has a contracted shape corresponding to moving from a first material phase to a second material phase in the first actuation state, and an expanded shape corresponding to moving from the second material phase to the first material phase in the second actuation state; at least one termination component fixedly coupled to the shape memory wire, wherein the termination component comprises a termination surface shaped for electrical contact with the first contact surface of a respective contact element. In an example, in the first actuation state, the shape memory wire generates an actuator force in the third direction, and the termination surface of the at least one termination component transfers at least part of the actuator force to the first contact surface of the at least one contact element, wherein the third direction is divergent from the first direction.

In another example, a method for controlling actuation of an actuated locking device is provided. The method includes transmitting, via at least one electrical interface of a circuit board, an electrical signal to a first surface of at least one contact element connectable to a body of a capture connector, wherein the first surface extends in a first direction, wherein the least one contact element includes a second surface extending in a second direction that is in electrical contact with a termination surface of at least one termination component fixedly coupled to a shape memory wire extending in a third direction. The method further includes transitioning the shape memory wire to a first actuation state based on the electrical signal transmitted to the first surface, wherein in the first actuation state the shape memory wire has a contracted shape corresponding to moving from a first material phase to a second material phase. The method further includes generating, by the shape memory wire, an actuator force in the third direction in response to moving from the first material phase to the second material phase. The method further includes transferring, the termination surface of the at least one termination component, at least part of the actuator force to the first contact surface of the at least one contact element, wherein the third direction is divergent from the first direction.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIG. 5-1 is a perspective partial cutaway view of the portion of the example capture connector of FIG. 4.

FIG. 5-2 is a partial perspective view, and partial cross-sectional view along line 5-2-5-2 in FIG. 5-1.

FIG. 5-3 is a perspective, partial cutaway view of the example termination components terminating the shape memory wire of FIG. 4 in accordance with aspects described herein.

FIGS. 5-4 and 5-5 are perspective top and bottom views of the example capture connector (and contact elements) of FIG. 4, in accordance with aspects described herein.

FIGS. 6-1, 6-2, and 6-3 are perspective views of an example of an assembly method for inserting the shape memory wire being through the capture connector, in accordance with aspects described herein.

FIG. 8-1 is a partial cross-sectional side view of an example of a locking system in an undocked configuration.

FIG. 8-1-1 is a zoom-in-view of area 8-1-1 of the locking system in FIG. 8-1.

FIG. 8-2 is a partial cross-sectional side view of the example of the locking system 8-1 in a locked configuration.

FIG. 8-2-1 is a zoom-in-view of an example of area 8-2 of the locking mechanism in FIG. 8-1.

FIG. 8-3 is a partial cross-sectional side view of the example of the locking mechanism beginning to move into an unlocked configuration.

DETAILED DESCRIPTION

Figure 1:
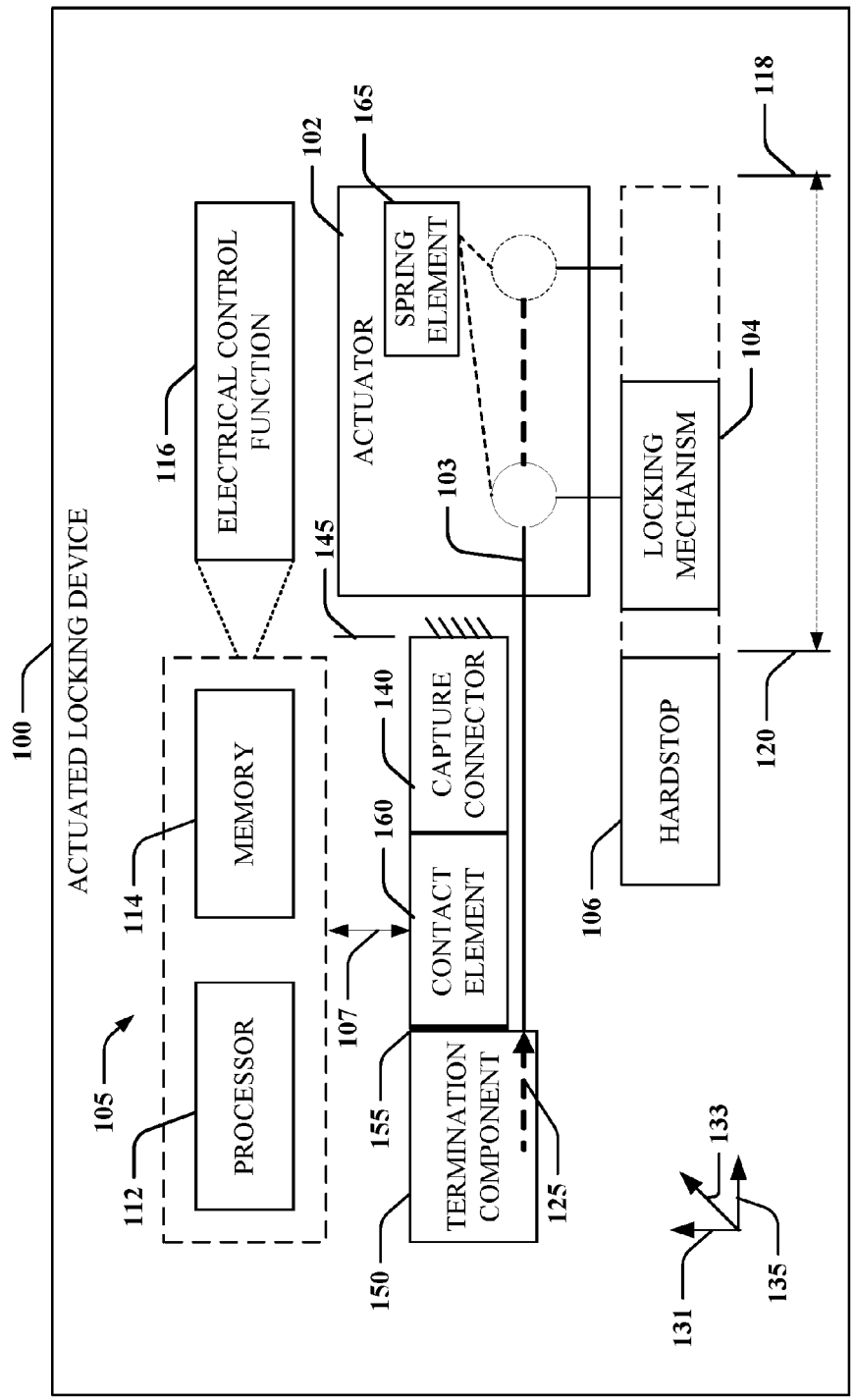
FIG. 1 is a schematic diagram of an example of an actuated locking device including a capture connector in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to an actuated locking device having an actuator that includes a shape memory (SM) wire for moving a locking mechanism between locked and unlocked positions. The actuated locking device described herein includes a capture connector that facilitates an electrical connection between the SM wire and components that control the actuation of the actuator.

Conventionally, a prior art actuated locking device may include one or more hook crimps mechanically crimped on the ends of the SM wire. The one or more hook crimps may have a hook-shaped or c-shaped body for being removably attached to the edge of a circuit board. Also, the hook-shaped or c-shaped body has an inner contact surface positionable to be in contact with an electrical interface surface of the circuit board. However, the design of such conventional hook crimps allows the hook crimps to be in a movable or floating (i.e., not fixed) position relative to the electrical interface surface of the circuit board. In other words, the configuration of these conventional hook crimps causes the SM wire to apply an actuator force parallel to the contact surfaces of the one or more hook crimps and the electrical interface surface of the circuit board. As such, the hook crimps are capable of moving, in the plane of the actuator force and contact surface, from their initial position corresponding to the electrical interface surface of the circuit board. As such, in some cases, the hook crimps may move off their initial position enough so as to cause the electrical connection to be disrupted, e.g., where the hook crimps may no longer receive an electrical signal from the electrical interface surface of the circuit board. As a result, there may be instances in which the SM wire is not actuated properly due to an inconsistent or total lack of an electrical connection, thereby causing the actuator, and hence the locking mechanism, to malfunction.

The aspects described herein advantageously utilize a capture connector to provide a more robust and efficient electrical connection between the SM wire of the actuator and that controls the actuation of the SM wire. For example, the capture connector may include a body on which a contact element is mounted, wherein the contact element includes a first contact surface that interacts with a termination component fixedly coupled to the SM wire. In particular, the first contact surface electrically connects the SM wire to the control circuitry via a termination surface of the termination component. Notably, in the described aspects, the first contact surface is positioned to lie in a direction divergent from a direction of the actuator force or tension applied by the SM wire upon the termination component. In other words, the SM wire provides the tension or actuator force in a direction that is normal or oblique to a plane of the first contact surface of the contact element. The capture connector maintains a substantially fixed position to oppose such tension or actuator force, thereby increasing an electrical contact between the connector element and the termination component at the interface between the first contact surface and the termination surface. Moreover, the connector element may include a second contact surface connected to the first contact surface, where the second contact surface is electrically connectable to the control circuitry that provides signals to control actuation of the SM wire. In an aspect, the capture connector secures the second contact surface in a position to maintain electrical contact with the control circuitry, e.g., with a contact surface of a circuit board. Accordingly, such a capture connector may reduce or eliminate the design issues that occur with respect to creating an electro-mechanical connection between the SM wire and a contact element and/or circuit board connected to the control circuitry that manages actuation of the SM wire in an actuated locking device. Further, the concepts described herein can be designed to have more easily achievable tolerance requirements, as compared to other solutions, in addition to enhancing the electro-mechanical connection between the SM wire and the control circuitry. The more easily achievable tolerances can reduce design requirements and manufacturing cost for the actuated locking device as compared to existing solutions. Moreover, based on the configuration of the capture connector maintaining the first contact surface of the connector element in a direction normal or oblique to a direction of the tension or actuator force supplied by the SM wire, the concepts described herein may allow for increasing electrical contact at the interface of the electrical connection between the SM wire and the control circuitry upon increasing actuation of the SM wire.

FIG. 1 is a schematic diagram of an example of an actuated locking device 100 in accordance with aspects described herein. For example, actuated locking device 100 can be employed by a device to lock one or more portions of the device (e.g., to another portion of the device, to another device, to a dock, etc.). In an example, actuated locking device 100 can include an actuator 102 having a shape memory (SM) wire 103 with different phases corresponding to different shapes for use in actuating a locking mechanism 104. For example, SM wire 103 may be directly or indirectly connected to locking mechanism 104 such that actuation between a first phase and a second phase may move locking mechanism 104 among a plurality of positions, including at least a first position 118 and a second position 120 to respectively provide a locking and/or unlocking action. For example, the locking mechanism 104 can be a mechanical locking mechanism that may include a locking protrusion that moves within a locking receptacle or recess to cause the locking and/or unlocking action. Further, it should be noted that while FIG. 1 illustrates linear movement of locking mechanism 104 between first position 118 and second position 120, locking mechanism 104 may be configured for any type of movement (e.g., along a curve, curvilinear, movement in more than one plane, etc.) in response to actuator 102.

According to the present aspects, actuated locking device 100 includes a capture connector 140 that can be positioned within actuated locking device 100 to enhance electrical connectivity between the SM wire 103 and corresponding control components 105 that control actuation of actuator 104. For example, the control components 105 may include a processor 112 and/or memory 114 executing an electrical control function 116, and corresponding electrical circuitry 107 such as an wire or circuit board, that electrically connects directly or indirectly to the SM wire 103 to control actuation of the SM wire 103. Further, for example, actuated locking device 100 includes a contact element 160 electrically connected with electrical circuitry 107, processor 112, memory 114, and electrical control function 116, and a termination component 150 fixedly attached to SM wire 103. In particular, capture connector 140 can be positioned to maintain an electrical interface 155 between contact element 160 and termination component 150. For example, capture connector 140 can be fixedly or removably mounted to a body or chassis of actuated locking device 100 at a fixed position 145, and contact element 160 can be mounted to or positioned adjacent to capture connector 140. As such, the tension and/or actuator force 125 in SM wire 103 is transferred to termination component 150 and opposed by capture connector 140, such that the opposing forces cause termination component 150 and contact element 160 to maintain contact at electrical interface 155. Particularly, the present aspects configure contact element 160 and termination component 150 such that all or at least a portion of electrical interface 155 lies in a first, divergent direction, e.g., a perpendicular direction 131 or an oblique direction 133, with respect to a second direction 135 of tension or actuator force 125 of SM wire 103. In other words, tension or actuator force 125 of the SM wire 103 is normal or oblique to the first direction of electrical interface 155. As such, increased tension or actuator force 125 in the SM wire 103 may increase an amount of contact between termination component 150 and contact element 160 at electrical interface 155, thereby improving electrical connectivity between the SM wire 103 and the control components 105.

The SM wire 103, in one example, may be formed from a material or combination of materials having an elasticity property where the wire can switch between phases to lengthen (e.g., expand) and shorten (e.g., contract) a length of the wire (e.g., or a shape of the wire) based on a temperature of the wire, or based on stress applied to the wire. Suitable examples of a material that can be used to form the SM wire 103 include, but are not limited to, a shape memory metal alloy, such as nickel titanium (e.g., nitinol), and a shape memory polymer. For example, upon receiving an electrical signal (e.g., from control components 105) that results in heat based on internal resistance in the SM wire 103, the SM wire 103 may cause actuation of the locking mechanism 104 from first position 118 to second position 120 based on a length of the SM wire 103 contracting or shortening from a first phase (e.g., an original shape of the wire) to a second phase (e.g., a deformed shape of the wire). Subsequently, a lowering of a temperature (e.g., removing the electrical signal for a period of time) of the SM wire 103 causes or allows the SM wire 103 to expand or lengthen (e.g., from the second phase to the first phase or another phase in between) to at least partially cause or allow actuation of the locking mechanism 104 back toward the first position 118.

In addition, the actuator 102 can include a mechanism to aid or cause the SM wire 103 to return to the first position 118 and/or the first phase. For example, the actuator 102 can include a mechanism, such as a spring element 165, having an elasticity to store mechanical energy. In particular, in one implementation, the spring element 165 is configured to stretch when the locking mechanism 104 is actuated by the SM wire 103 from the first position 118 to the second position 120. As such, the spring element 165 provides a spring force on the SM wire 103 to return the locking mechanism 104 to the first position 118 (e.g., corresponding to the original shape or a less deformed shape or longer length of the SM wire 103) when the SM wire 103 is cooled, de-stressed, or otherwise released from the second phase. Further, it should be noted that the SM wire 103 can be assembled into the actuated locking device 100 such that some amount of tension or actuator force 125 is generally present.

Further, as mentioned above, actuated locking device 100 may include or may otherwise be coupled with a processor 112 and/or a memory 114, where the processor 112 and/or the memory 114 may be configured to execute or store instructions or other parameters related to executing electrical control function 116 for controlling actuator 102 and locking mechanism 104 via electrical circuit 107. In an aspect, the electrical circuit 107 may include an electrical connection (e.g., a circuit board) between processor 112 (and memory 114 and electrical control function 116) and SM wire 103, such that processor 112 can send an electrical signal to SM wire 103 to control phase changes and hence actuation of actuator 102. In an example, electrical control function 116 can be implemented to control the actuator 102 based on receiving a notification of an event, e.g., a lock or unlock signal (e.g., based on a user input received at one of the portions that may be or that are to be locked together) or a signal identifying a position of the locking mechanism 104 (e.g., at first position 118 or second position 120). For example, electrical control function 116 may detect activation of an electronic switch on a device utilizing the actuated locking device 100, which is to cause the locking mechanism 104 to move to a locked or unlocked state. In this example, electrical control function 116 can control the actuator 102 (e.g., via processor 112) to actuate the locking mechanism 104 based on the received notification. In another example, electrical control function 116 can control the actuator 102 to maintain actuation of the locking mechanism 104 at a current position, e.g., second position 120 (e.g., at least for a period of time and/or based on electrical control function 116 detecting another event, such as another electronic switch to cause actuation of the locking mechanism 104 in the other direction).

Additionally, actuated locking device 100 can include a hardstop 106 that can limit an amount of movement and/or actuation of the locking mechanism 104. In some cases, hardstop 106 may comprise a body that defines a mechanical limit to movement of locking mechanism 104, e.g., limited to second position 120. In other cases, or in addition, hardstop 106 may define an electrical switch that provides feedback to control components 105 to allow control of the actuation of actuator 104, e.g., by modulating the electrical signal applied to SM wire 103, thereby electrically limiting movement of locking mechanism 104. In other words, actuation of the locking mechanism 104 can be caused to stop and/or be maintained at second position 120 based on the locking mechanism 104 contacting the hardstop 106, which is positioned to limit movement of locking mechanism 104 and also which may act as a switch that controls modulating actuator 102 in actuating locking mechanism 104.

Figure 2:
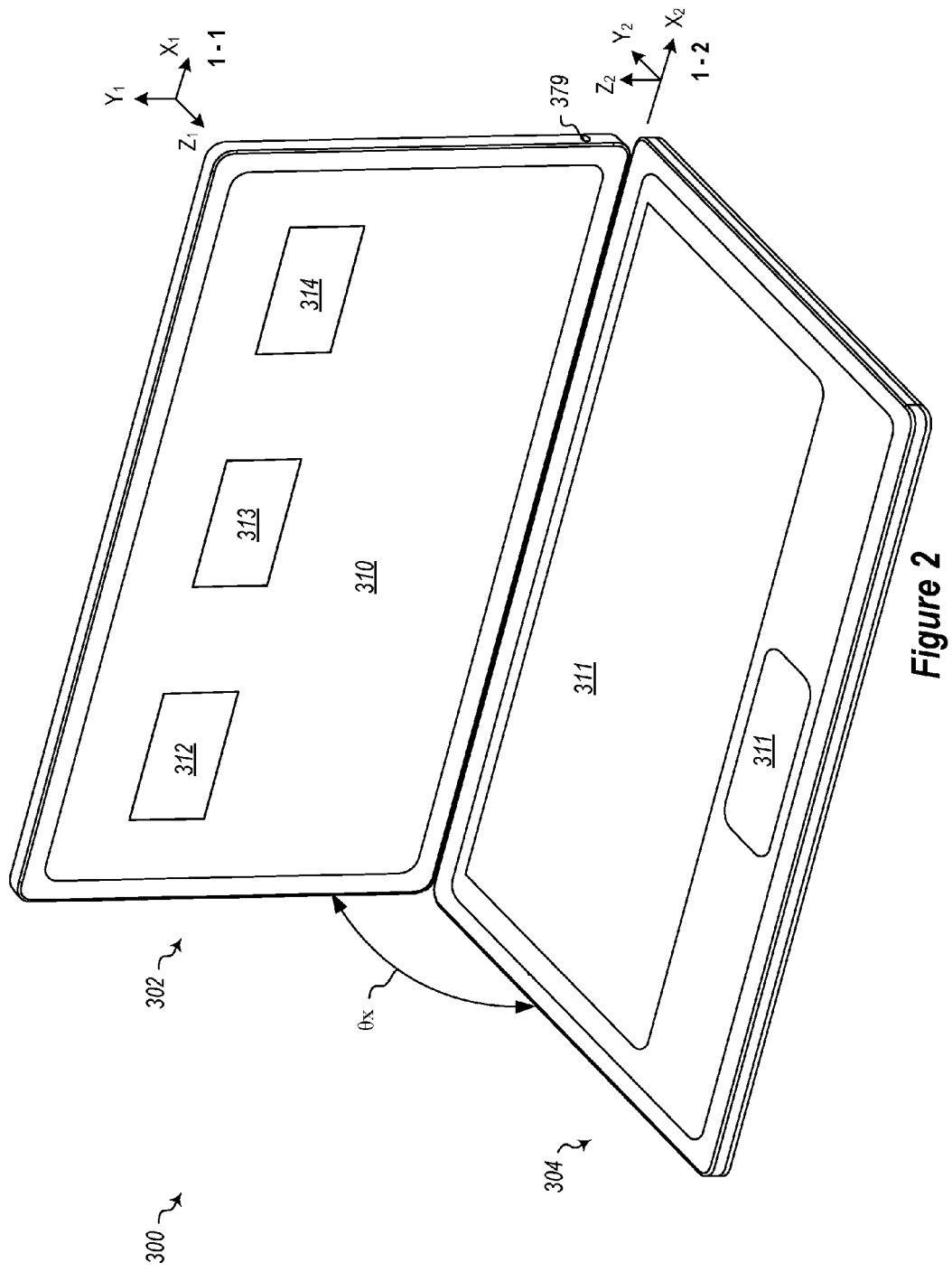
FIG. 2 is an isometric view of an example of a computing device that includes an actuated locking device including a capture connector in accordance with aspects described herein.
Figure 3:
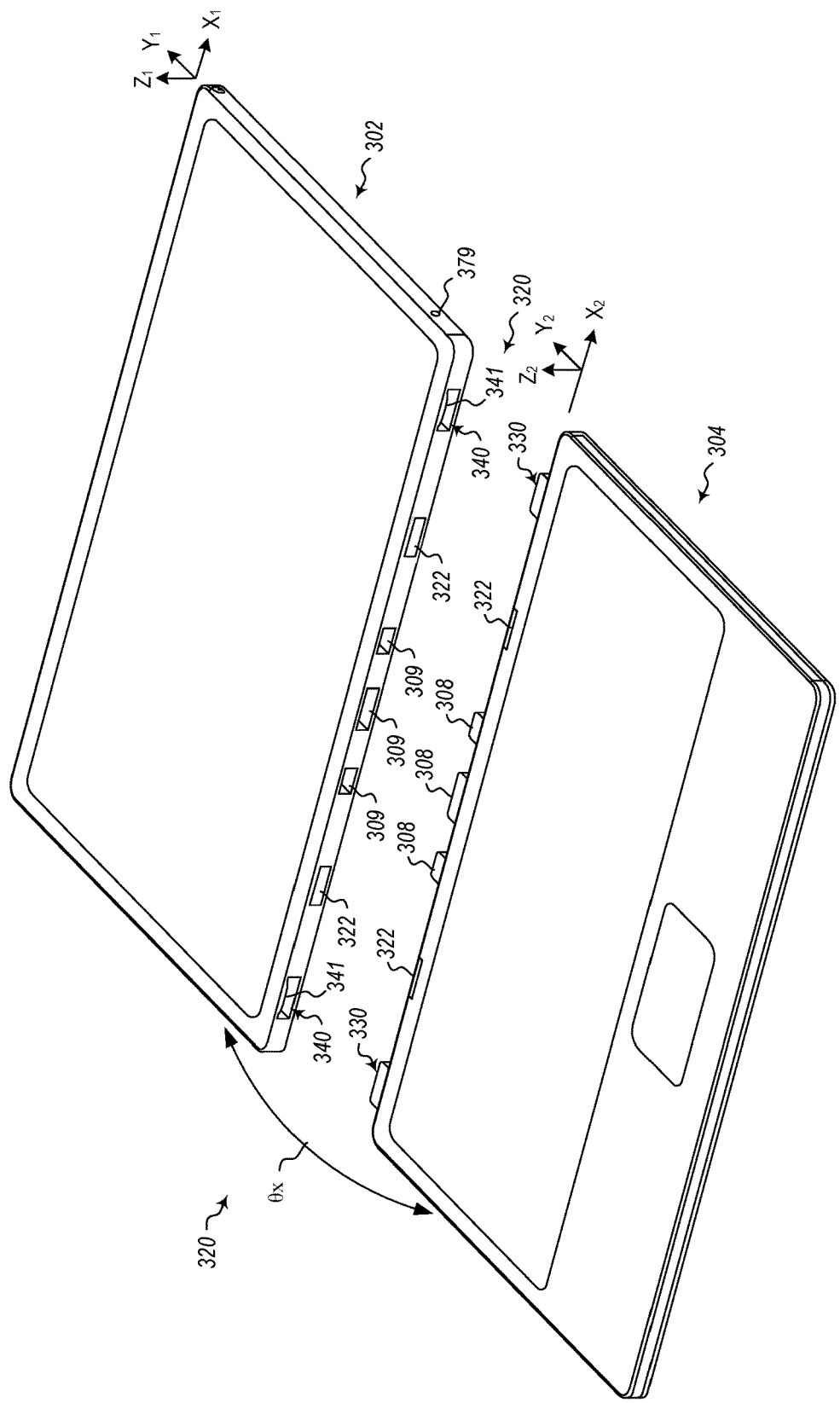
FIG. 3 is an isometric perspective view of the example of the computing device in FIG. 3 with portions separated from one another.

Referring to FIGS. 2 and 3, one example of a computing device 300 having connected (FIG. 2) and/or locked (FIG. 3) portions, including one or more locking systems 320 to lock and unlock the portions. As such, the one or more locking systems 320 may be considered an example implementation of actuated locking device 100 (FIG. 1), in accordance with aspects described herein.

The computing device 300 may include a first portion 302 and a second portion 304. The first portion 302 may be separably connected to the second portion 304 by one or more locking systems 320 (see FIG. 3). For example, the first portion 302 may be mechanically connected to the second portion 304 in a docked (and/or locked) configuration by locking of the one or more locking systems 320, such as the docked configuration shown in FIG. 2. The first portion 302 may transition from the docked configuration to an undocked configuration, such as the undocked configuration shown in FIG. 3, by unlocking the one or more locking systems 320. The first portion 302 and the second portion 304 may transition from the connected to the undocked configuration and from the unconnected to the docked configuration.

In one aspect, which should not be construed as limiting, the locking system 320 may include a locking protrusion 330 and a locking receptacle 340 (shown in FIG. 3), which may be considered part of locking mechanism 104 in this example implementation. Although illustrated on a respective one of first portion 302 and second portion 304 of computing device 300, it should be understood that in other implementations the location of locking protrusion 330 and locking receptacle 340 may be switched. The locking receptacle 340 may include an aperture 341 through which the locking protrusion 330 may be inserted. Further, for example, locking system 320 may include a carrier 550 (not visible in FIGS. 2 and 3; see FIGS. 4, 8-1, 8-2, and 8-3) as part of locking mechanism 104 described previously, such that at least a portion of carrier 550 engages with locking protrusion 330 within locking receptacle 340. For example, additional aspects of locking system 320, which can be one example implementation of actuated locking device 100, are described below with respect to FIGS. 4 and 5.

By way of orientation, a first coordinate system 1-1 (including the x1-direction, the y1-direction, and the z1-direction) is provided for the first portion 302 and a second coordinate system 1-2 (including the x2-direction, the y2-direction, and the z2-direction) is provided for the second portion 304. In the illustrated configuration, these coordinate systems 1-1, 1-2 are rotated about their respective x-axes. When the angle ($\theta$x) between the first portion 302 and the second portion 304 is one-hundred and eighty degrees, the x1 and x2 axes are parallel, the y1 and the y2 axes, and the z1 and the z2 axes are parallel. When the angle ($\theta$x) between the first portion 302 and the second portion 304 is ninety degrees, the x1 and x2 axes are parallel, the y1 and the z2 axes are parallel, and the z1 and the y2 axes are parallel (but opposite (e.g., positive values extending in opposite directions)). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 302 may include a display 310. The display 310 may be a touch sensitive display screen. The second portion 304 may include an input device 311. The input device 311 may include a keyboard, touchpad, one or more buttons, other input devices, or combinations thereof that may be used to provide input to the processor 312. Although a hybrid computing device is shown, the aspects described herein may be used with other computing devices where two portions are separably connected together. For example, the first portion 302 may be a mobile phone and the second portion 304 may be a cover, a keyboard, or other device. In other examples, the docking mechanisms described herein may be used in a non-computing environment.

Although FIGS. 2 and 3 illustrate the display 310 of the first portion 302 and the input device 311 of the second portion 304 as facing each other (e.g., both being on the front side of their respective portions), in at least one embodiment described herein, the first portion 302 and second portion 304 may be reversible. For example, the first portion 302 may connect to the second portion 304 as shown (e.g., with the display 310 facing the front) and may be undocked, rotated 180 degrees, and docked to the second portion 304 such that the first portion 302 faces the opposite direction (e.g., with the display 310 facing the back). Thus, the locking system 320 may be configured to allow a reversible connection between the first portion 302 and the second portion 304.

The first portion 302 and/or the second portion 304 may include a processor 312 (which may be similar to or the same as processor 112), memory 313 (which may be similar to or the same as memory 114), a battery 314, other computing components, or combinations thereof. Thus, in an example, processor 312 may include, be coupled to, or otherwise implement or execute electrical control function 116 to control actuator 102 for locking and unlocking of locking system 320, as described herein. For example, as shown, the first portion 302 may include a processor 312, memory 313, and a battery 314 while the second portion 304 may also include a processor 312. In some embodiments, only one of the first portion 302 or the second portion 304 may include a processor 312. In other embodiments, both of the first portion 302 and the second portion 304 include a processor 312. In further embodiments, one or more computing components (e.g., processors 312, memory 313, and battery 314) may be included in the first portion 302 and/or the second portion 304 in any combination.

The computing components in the second portion 304 may be in electronic communication with one or more of the computing components in the first portion 302. For example, as shown in FIG. 3, the first portion 302 and the second portion 304 may be in electronic communication via a physical electrical connector that includes an electrical protrusion 308 and an electrical receptacle 309.

As shown in FIG. 3, one or more electrical protrusions 308 are located on the second portion 304 and one or more electrical receptacles 309 are located on the first portion 302. In other embodiments, one or more electrical receptacles 309 are located on the second portion 304 and one or more electrical protrusions 308 are located on the first portion 302. In further embodiments, the first portion 302 and the second portion 304 may include one or more electrical receptacles 309 and one or more electrical protrusions 308, such that each of the first portion 302 and second portion 304 may include a combination of electrical receptacles 309 and electrical protrusions 308.

The electrical protrusions 308 and/or electrical receptacles 309 may include various electrical connections. As shown, the electrical protrusions 308 and electrical receptacles 309 include multiple pin connectors. In embodiments where computing components (e.g., the processor 312, memory 313, or battery 314) are on separate portions (e.g., first portion 302 and second portion 304), maintaining electrical communication between the first portion 302 and the second portion 304 may be important. For example, if a computing component on the second portion 304 were to lose electrical communication with an electrical component on the first portion 302, the computing device 300 may fail (e.g., an operating system may crash or a computing component may be affected by a power surge when the electrical connection is restored). Some electrical connections may be sensitive (e.g., high speed).

Thus, in some embodiments, it may desirable for the first portion 302 and the second portion 304 to be securely connected together in the docked configuration by locking system 320. In particular, the locking system 320 may include carrier 550 movable to engage locking protrusion 330 within the aperture 341 of the locking receptacle 340. Additionally, in some aspects, locking system 320 may further include a magnet 322, which is described in more detail below. Furthermore, in some embodiments, it may be desirable for a computing component (e.g., the processor 312, memory 313, or battery 314) in the second portion 304 to hand off its responsibilities to a computing component (e.g., the processor 312, memory 313, or battery 314) on the first portion 302 (and/or vice versa) before undocking from the first portion 302.

The computing device 300 may include one or more locking protrusions 330. As illustrated in FIG. 3, the computing device 300 may alternatively include two (or more) locking systems 320 (e.g., within two (or more) locking receptacles 340 for contacting two (or more) locking protrusions 330). In other embodiments, more or fewer locking systems 320 may be used. For example, a single locking system 320 may be used. The locking system 320 may incorporate both a single locking protrusion 330 and one or more components of one or more electrical protrusions 308 into the single locking protrusion 330 to be inserted into a single locking receptacle 340 that includes one or more components of one or more electrical receptacles 309 (e.g., the locking mechanism 504 partially shown in FIG. 4).

Computing device 300 may include one or more locking receptacles 340 on the first portion 302 and one or more locking protrusions 330 on the second portion 304. In other embodiments, the first portion 302 and the second portion 304 may each include one or more locking protrusions 330 and corresponding one or more locking receptacles 340. In other words, the first portion 302 may include a first locking protrusion 330, a second locking receptacle 340, and a third locking protrusion 330 and the second portion 304 may include a first locking receptacle 340 corresponding to the first locking protrusion 330 on the first portion 302, a second locking protrusion 330 corresponding to the second locking receptacle 340 on the first portion, and a third locking receptacle 340 corresponding to the third locking protrusion 330 on the first portion. More and/or fewer combinations of locking protrusions 330 or locking receptacles 340 (e.g., only locking protrusions 330 or locking receptacles 340 on each portion or combinations of locking protrusions 330 or locking receptacles 340 on each portion) may be used.

Figure 4:
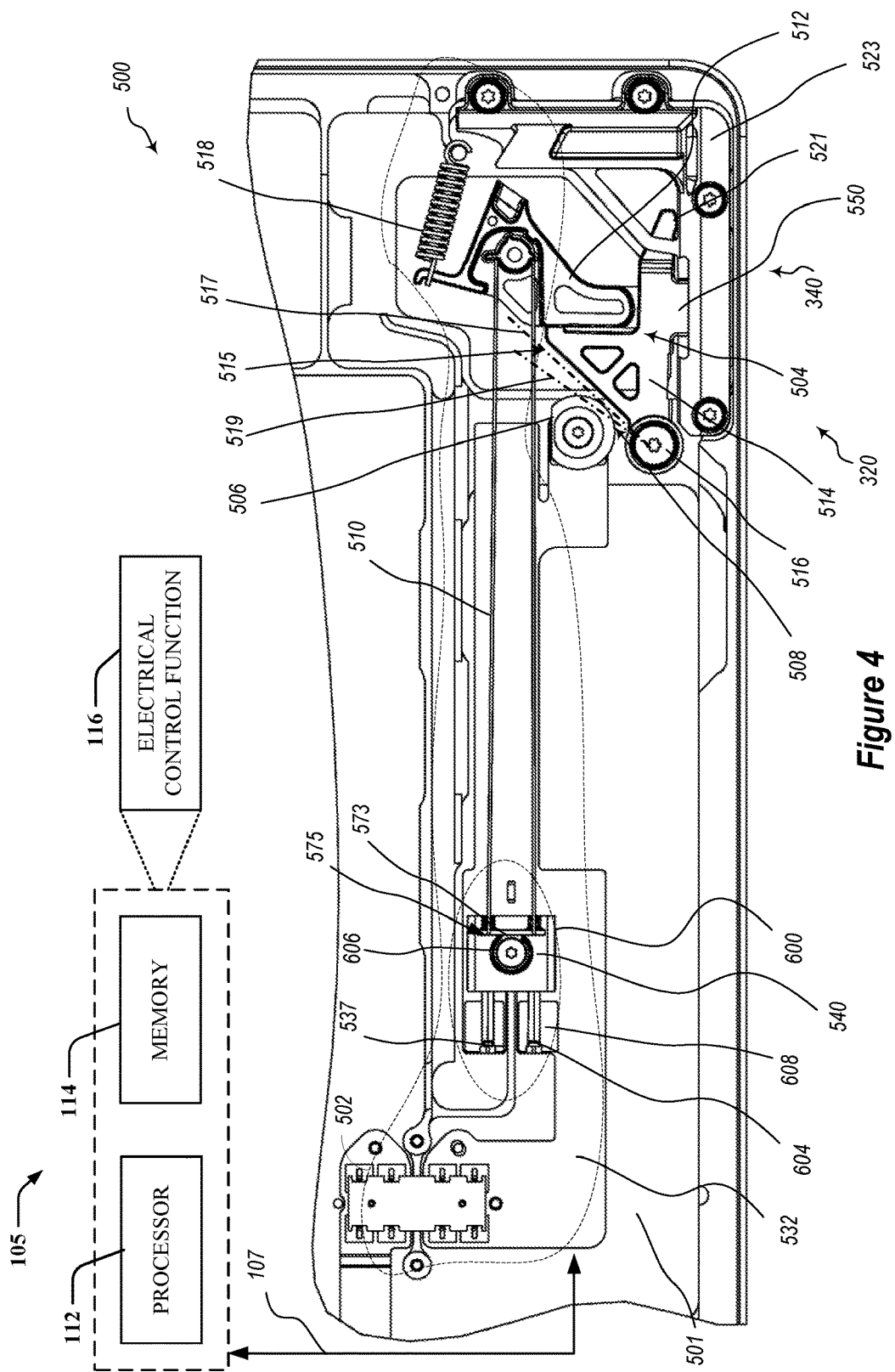
FIG. 4 is a front, partial cutaway view of a portion of the example computing device of FIGS. 2 and 3, wherein the portion employs an example capture connector in accordance with aspects described herein.
Figures 1, 5:
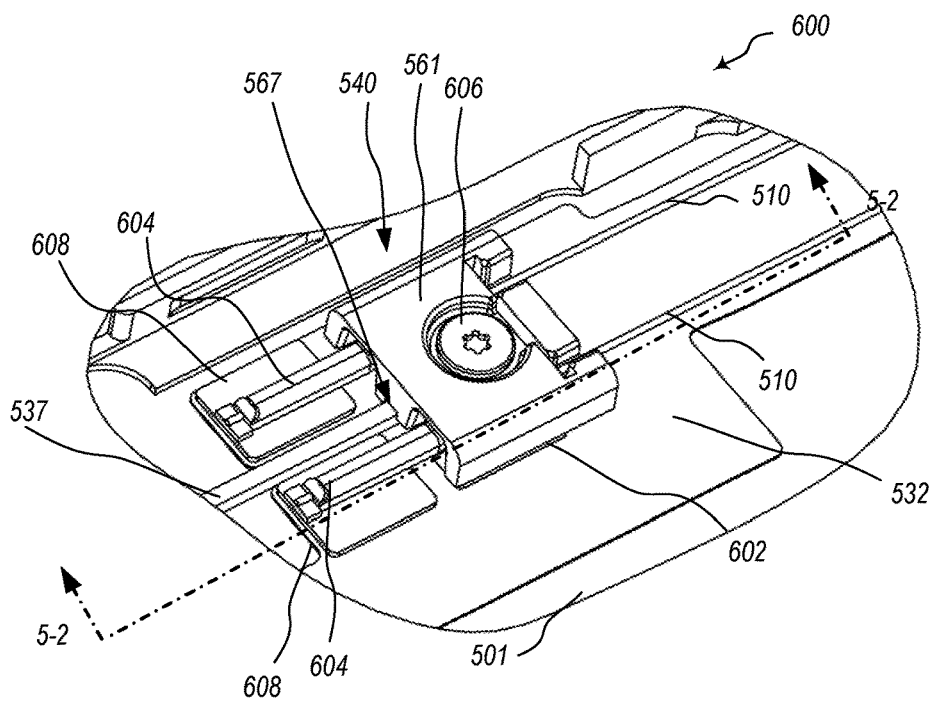
Figures 2, 5:
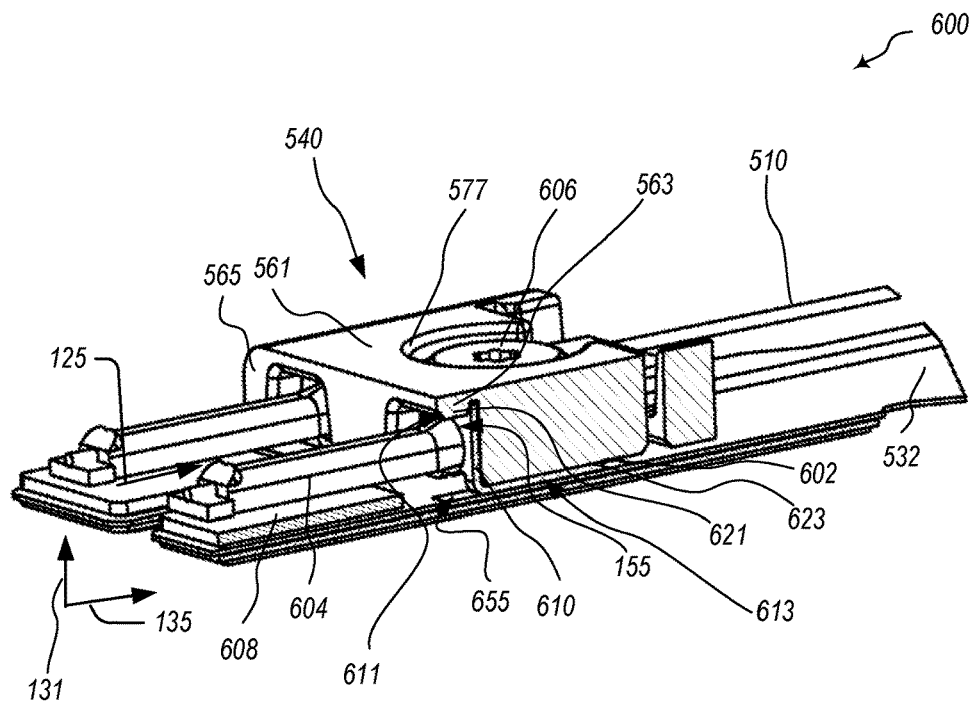
Figures 3, 5:
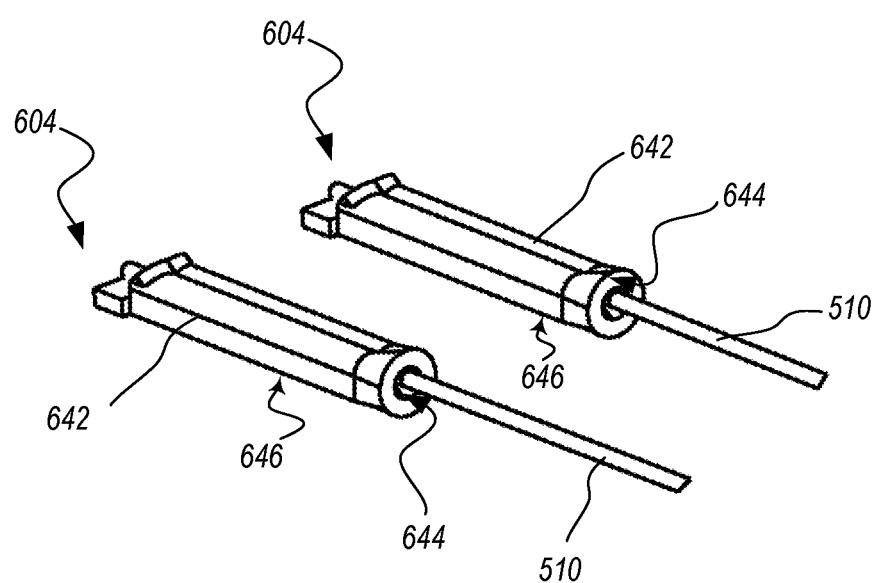
Figures 4, 5:
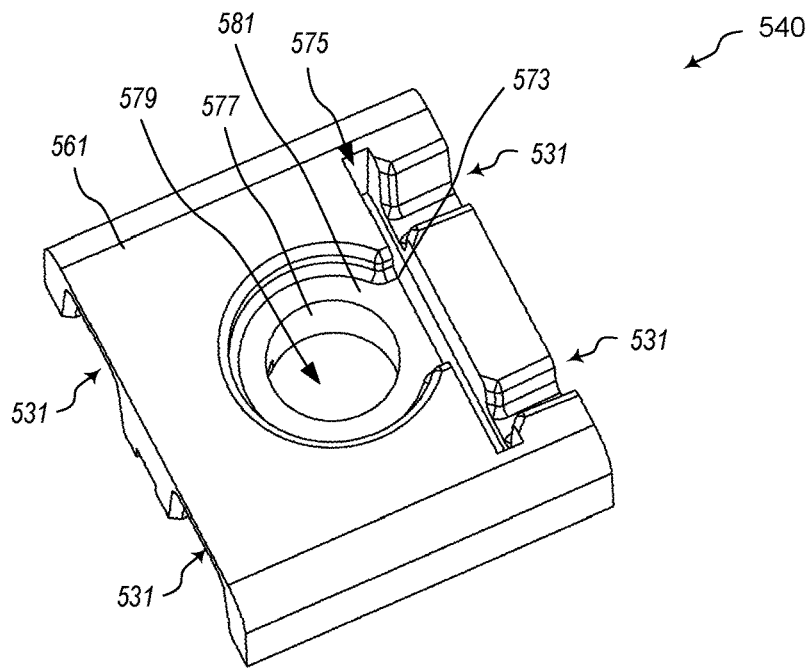
Figure 5:
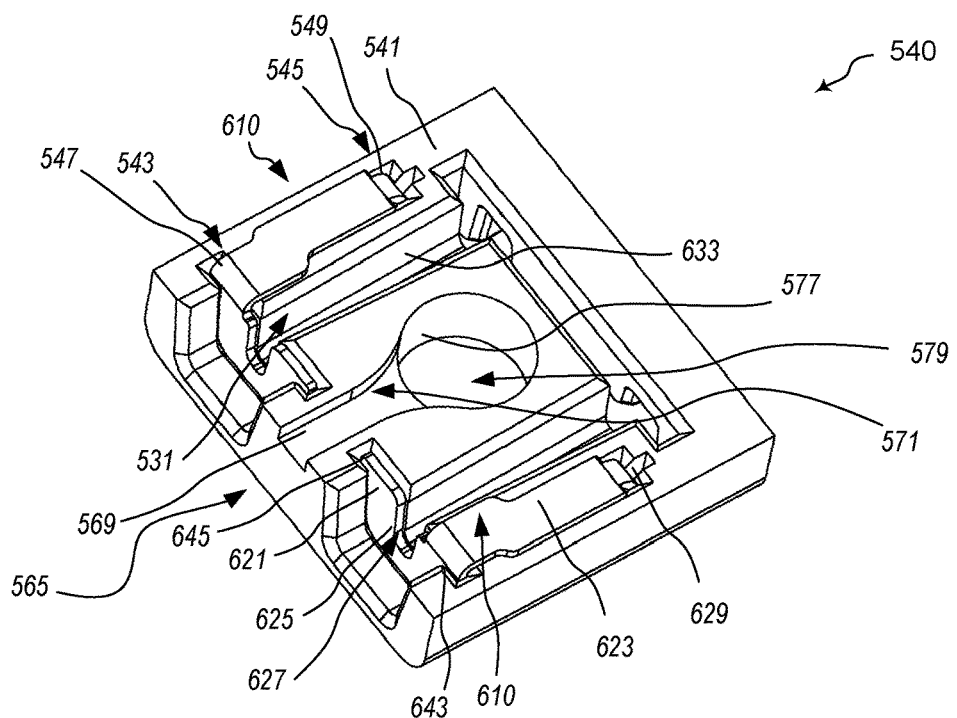

Referring to FIGS. 4, and 5-1 to 5-5, an example of a portion 500 of a computing device (e.g., first portion 302 or second portion 304 of computing device 300) includes a more specific example of the locking system 320. In this example, a locking mechanism 504 is moveable between states by an actuator 502 including an SM wire 510 that has an enhanced electrical connection with the control components 105 based on use of a capture connector 540. In particular, the capture connector 540 is mounted at a fixed position to the portion 500 of the computing device 300, and acts to secure ends of the SM wire 103. In this case, the actuator 502, the SM wire 510, the locking mechanism 504, and the capture connector 540 may be examples of the actuator 102, the SM wire 103, the locking mechanism 104, and the capture connector 140 of FIG. 1.

As in FIG. 1, the control components 105 in this example can include the processor 112, the memory 14, the electrical control function 116, as well as electrical circuitry 107 that electrically connects to the SM wire 510. In particular, in this case, electrical circuitry 107 may include a circuit board 532 (e.g., such as an FPC and/or the electrical circuitry 107 may interface with wires and/or any conductive material) having at least one electrical interface 602 configured to deliver the electrical signal from the control components 105 to the actuator 502, and more specifically, to the SM wire 510. For example, the circuit board 532 may be a rigid or flexible (e.g., flexible printed circuit (FPC)), relatively thin, rectangular structure that substantially lies in a plane of the portion of computer device 300 in which it is mounted. Moreover, the at least one electrical interface 602 defines an electrically conductive area (e.g., comprising copper, gold, or any other electrically conductive material) having a surface that is sized and shaped to face the capture connector 540 and/or at least a portion of a contact element 610, as described below.

In this example, the actuator 502 includes, at least, the SM wire 510 that provides the actuator force 125 for actuating the locking mechanism 504, termination components 604 that define a termination point at each end of the SM wire 510, contact elements 610 that bridge an electrical connection between the at least one electrical interface 602 of the circuit board 532 and the SM wire 510 via the termination components 604, and the capture connector 540 that is fixedly positioned to secure the ends of the SM wire 510 and that provides one or more features to ensure electrical connectivity between the SM wire 510 and the control components 105. Additionally, in an aspect, actuator 502 can include a spring element 518 (the same as or similar to spring element 165 of FIG. 1) that provides a spring force opposite to a direction of contraction of the SM wire 510 in order to assist the SM wire 510 to return to an original phase.

For instance, in this implementation, the SM wire 510 is a wire made from a shape memory material, such as a shape memory allow or a shape memory polymer. As assembled, the SM wire 510 is positioned in portion 500 such that the SM wire 510 is wound partially about a post of a first member 512 of the locking mechanism 504 and held in place at an opposing end by the capture connector 540. More specifically, the SM wire 510 is terminated at each end by respective termination components 604, such as barrel crimps, that are in electrical contact with the contact elements 610. Both the termination components 604 and the contact elements 610 are held in contact with each other, and retained in place, by the fixedly positioned capture connector 540 based on the tension or actuator force 125 in the SM wire 510.

For example, referring more specifically to FIG. 5-3, each termination component 604 includes a longitudinal body 642 having a termination surface 644 at one end for making electrical contact with a corresponding contact element 610. For example, each termination surface 644 defines an electrically conductive area (e.g., comprising copper, gold, or any other electrically conductive material) having a surface that is sized and shaped to face a corresponding surface of a corresponding contact element 610. Additionally, each termination component 604 may include a substantially flat bottom surface 646, which allows each termination component 604 to lie on a surface of the circuit board 532 and/or on the top surface of a spacer element 608 positioned between the circuit board 532 and each termination component 604. The spacer element 608, which may be formed of a non-conductive material, can help align the respective termination component 604 and termination surface 644 with a respective contact surface of a corresponding contact element 610.

Further, for example referring more specifically to FIG. 5-2, each contact element 610 includes a first member 621 extending in a first direction (e.g., direction 131) and having a first contact surface 611, and a second member 623 extending in a second direction (e.g., direction 135) and including a second contact surface 613. The first member 621 and the second member 623 may have longitudinally extending, rectangular, circular, and/or semicircular bodies connected together at corresponding ends. As such, in an aspect, each contact element 610 may have an L-shape, however, it should be understood that contact element 610 may be implemented in other shapes. Further, each of the first contact surface 611 and the second contact surface 613 defines an electrically conductive area (e.g., comprising copper, gold, or any other electrically conductive material) having a surface that is sized and shaped to face a corresponding contact surface.

In this example, for instance, the first contact surface 611 of each contact element 610 and the termination surface 644 of each termination component 604 are sized and shaped for electrical contact. As such, when assembled, the first contact surface 611 of the at least one contact element 610 and the termination surface 644 of the termination component 604 substantially lie in a first plane extending in the first direction (e.g., direction 131), thereby defining electrical interface 155. Further, when assembled, the actuator force 125 from the SM wire 510 is in a direction (e.g., direction 135) that is normal or oblique to the first plane. Moreover, as noted above, the bottom surface 646 of each termination component 604 can be configured to rest on the top surface of the spacer element 608, which is configured with a thickness so as to bias the termination component 604 to maximize a contact surface area at the electrical interface 155 between the termination surface 644 of the termination component 604 and the first contact surface 611 of each contact element 610.

Additionally, in this example, the second contact surface 613 of each contact element 610 and respective electrical interfaces 602 of the circuit board 532 are sized and shaped for electrical contact. As such, when assembled, the second contact surface 613 of each contact element 610 and the respective electrical interfaces 602 of the circuit board 532 substantially lie in a second plane extending in a second direction (e.g., direction 135), thereby defining another electrical interface 655.

Further, referring more specifically to FIG. 5-5, the first member 621 of each contact element 610 may be additionally configured to retain the SM wire 510. For example, the first member 621 of each contact element 610 may include an internal wall 625 that defines an opening 627 through which the SM wire 510 may be inserted. As illustrated in FIG. 5-5, the opening 627 may have an open-ended u-shape, which may enable easier assembly by allowing the SM wire 510 to be positioned in the opening 627 after being terminated by termination components 604. Further, the opening 627 may correspond to a partially open channel 531 defined by an inner wall 633 at the bottom surface of the capture connector 540 through which the SM wire 510 may extend. It should be noted that the open end of the u-shape may be configured to face another direction, e.g., away from the circuit board 532 in other implementations. Moreover, it should be noted that, in some implementations, opening 627 may not have an open end, but instead may define a through hole (which, depending on its size, may dictate that the SM wire 510 is positioned through the opening 627 prior to being terminated with the termination components 604).

Furthermore, in some implementations and still referring more specifically to FIG. 5-5, a distal end 629 of the second contact member 623 of each contact element 610 may extend away from second member 623 and away from the circuit board 532. As such, in some implementations, the body of the distal end 629 of the second contact member 623 and the body of the first contact member 621 may fit within corresponding recesses 543 and 545 defined by respective inner walls 547 and 549 opening at the bottom surface 541 of the capture connector 540. In some cases, only proximal portions 643 and 645 (e.g., not the full length) of each first contact member 621 fit within the respective recesses 543 and 545, which may provide a cost savings by reducing the amount of material used in forming each contact element 610. In some alternatives, the respective planes of the body of the distal end 629 of the second member 623 and the body of the first member 621 may not be parallel, which may allow them to snap into the corresponding recesses 543 and 545. In a further alternative example, the distal end 629 of the second contact member 623 may extend outside the body of the capture connector 540. In this example, a circuit board 532 may interface with a first capture connector (similar to capture connector 540) that includes extended distal ends which as attached to electrical leads (e.g., wires) that connect to a second capture connector that includes distal ends. The circuit board 532 may drive two actuators (e.g., the first capture connector and the second capture connector) that are connected using the electrical leads.

As mentioned above, the capture connector 540 is configured to maintain each contact element 610 in electrical communication with each termination component 604, at electrical interface 155, and with the circuit board 532, at electrical interface 655. The capture connector 540 can be formed of a polyamide, a plastic, or any non-conductive material. The capture connector 540 includes a body at least partially defined by the bottom surface 541, an opposing top surface 561, and one or more one side walls. For instance, the capture connector 540 may include one or more inner sidewalls 563 recessed from an outer sidewall 565, where the first contact member 621 of each contact element 610 may be positioned against a corresponding one of the inner sidewalls 563. Also, for example, the second contact member 623 of each contact element 610 may be positioned against at least some portion of the bottom surface 541 of the capture connector 540.

Additionally, as discussed to some degree in some examples above, the capture connector 540 may include one or more openings, recesses, or channels that may be used for retaining each contact element 610 and/or the SM wire 510, and/or for retaining the capture connector 540 to the portion 500 of the computer device 300. In particular, the bottom surface 541 of the capture connector 540 may include recesses 543 and 545 for receiving parts of the contact element 610. Further, the bottom surface 541 of the capture connector 540 may include partially open channel 531 for receiving a portion of the SM wire 510.

Additionally, in some implementations, the bottom surface 541 of the capture connector 540 may include a first mating component 567 that can engage with a second mating component 537 located on the circuit board 532 and/or on the chassis 501 of the portion 500 of the computer device 300. In this example, the first mating component 567 and the second mating component 537 are configured to have corresponding shapes that allow them to fit together to substantially resist at least one of a relative rotation and a relative translation between the capture connector 540 and the circuit board 532 and/or the portion 500 of the computer device 300. In one example implementation, the first mating component 567 may be defined by at least one inner wall 569 that defines a channel 571 opening to the bottom surface 541 of the capture connector 540 (see FIG. 5-5). Correspondingly, for instance, the second mating component 537 may be a rib having a height extending above the circuit board 532 and/or the chassis 501 of the portion 500 of the computer device 300, and further having a longitudinal length that at least partially extends into the channel 571 of the capture connector 540 (see FIG. 5-1).

In another implementation, the capture connector 540 may alternatively or additionally include an inner wall 573 extending between the bottom surface 541 and the top surface 561, thereby defining a through hole 575 through which the SM wire 510 may extend. For instance, the through hole 575 may cooperate with the channels 531 to enable the SM wire 510 to threaded through the through hole 575 and oriented with the channels 531, thus providing the capture connector 540 with a configuration that allows easy assembly of the actuator 502 and that envelops the SM wire 510 while allowing the SM wire 510 to move freely within the channels 531.

Figures 1, 6:
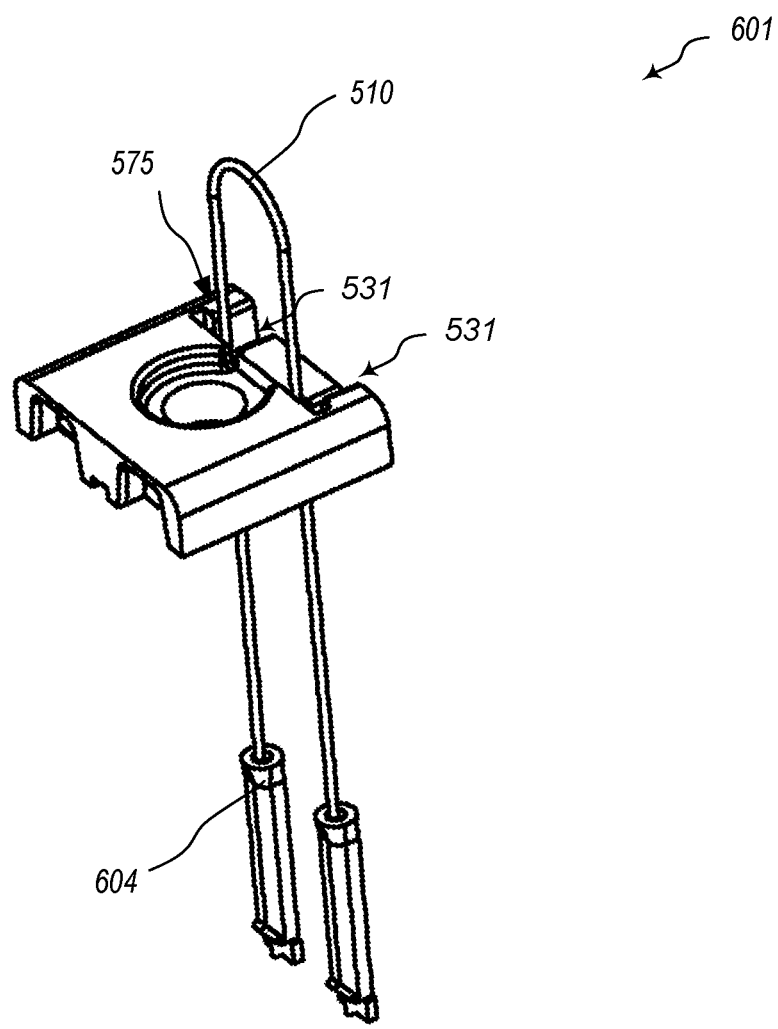
Figures 2, 6:
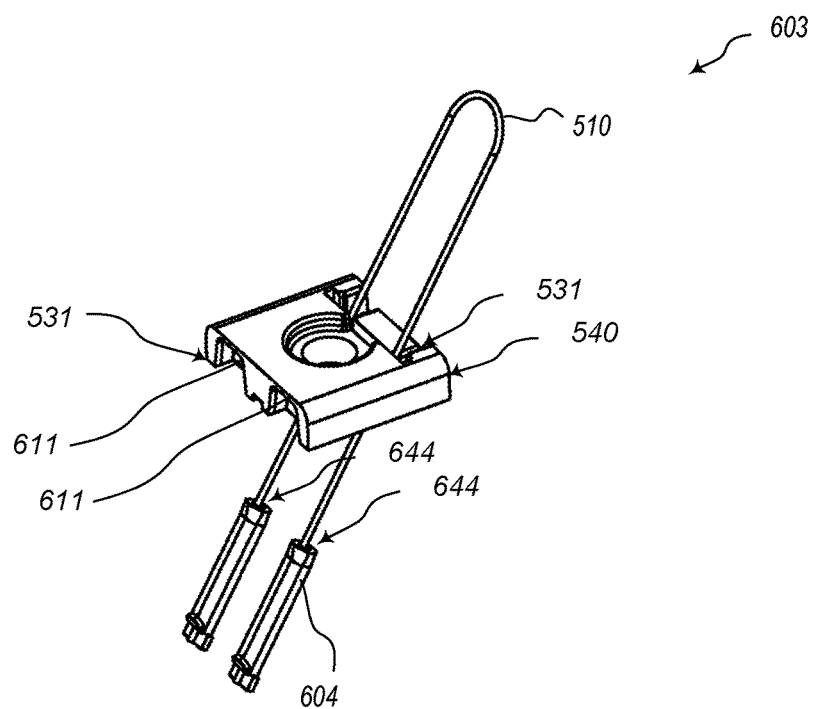
Figures 3, 6:
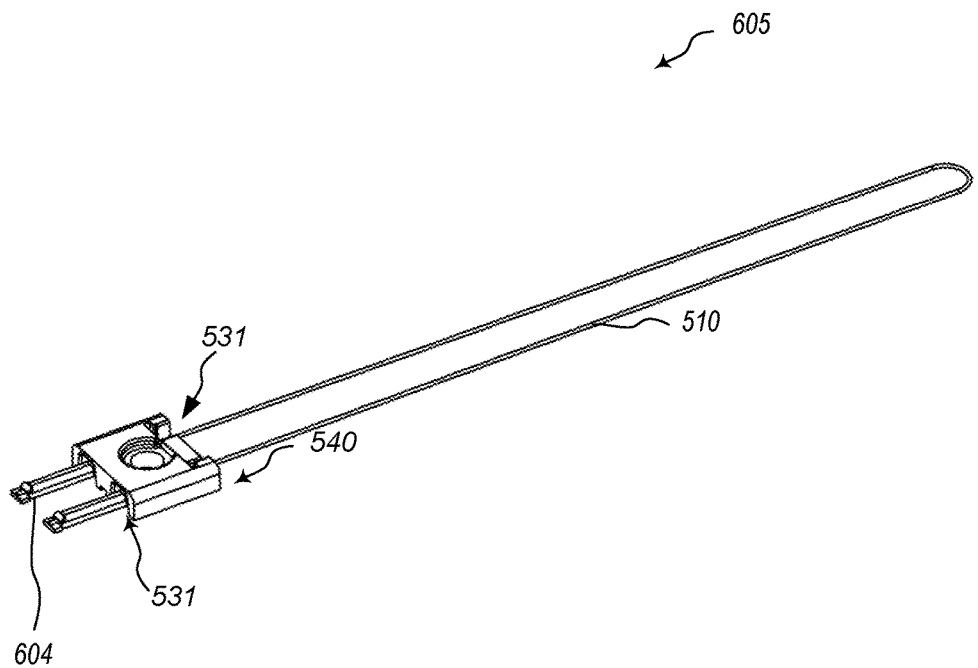

For example, referring to FIGS. 6-1 to 6-3, in one aspect of assembling at least part of the actuator 502, the ends of the SM wire 510 may be terminated with termination components 604 and the SM wire 510 may be bent for insertion through the through hole 575 of the capture connector 540 (see position 601 in FIG. 6-1). More specifically, the SM wire 510 is threaded through the through hole 575 of the capture connector 540 from the bottom surface 541 toward the top surface 561. Then, referring to position 603 in FIG. 6-2 and position 605 in FIG. 6-3, the SM wire 510 can be further moved through the through hole 575 and rotated down such that the SM wire 510 lies in channels 531 of the capture connector 700. In particular, the SM wire 520 can be further moved within the channels 531 such that the termination surface 644 of the termination components 604 make contact with the first contact surface 611 of the contact elements 610, e.g., at position 605. This can be considered a partial assembly. The assembly of the actuator 502 may additionally include hooking the looped portion of the SM wire 510 around a post of a first member 512 of locking mechanism 504 (FIG. 5), and fastening the capture connector 540 in position.

Referring back to FIGS. 4 and 5-1 to 5-5, the actuator 502 may additionally include one or more fasteners 606 configured to affix the capture connector 540 in position. One of the one or more fasteners 606 may include a mechanical or chemical mechanism for permanently or removably fixing the capture connector 540 at a fixed position within the portion 500 of the computer device 300. In some examples, the fastener 606 may include a screw, a thread, a nut, a bolt, a chemical bond, a physical or metallurgical bond, etc. Additionally, in some examples, the one or more fasteners 606 may aid in load handling capabilities of the capture connector 540. Further, in an example, the one or more fasteners 606 further reduce rotation in addition to the second mating component 537.

In one aspect, the fastener 606 may be a screw, comprising a polyamide, plastic, etc., and the fastener 606 may mate with a corresponding engagement portion in the circuit board 532 and/or in the chassis 501 of the portion 500 of the computer device 300. Further, the capture connecter 540 may include an inner wall 577 defining a through hole 579 from the top surface 561 to the bottom surface 541 of the capture connector 540. The through hole 579 is sized to interface with a supportive boss on chassis 501. For example, the fastener 606 is sized to removably fix the circuit board 532 between the capture connector 540 and the chassis 501, and thereby securing the circuit board 532. Additionally, the top surface 561 of the capture connector 540 may include a recessed surface 581 sized to receive a head portion of the screw (see FIG. 5-4). In other words, the fastener 606 in the form of a screw may be inserted through the through hole 579 and screwed into the circuit board 532 and/or in the chassis 501 of the portion 500 of the computer device 300 such that the head portion of the screw contacts the recessed surface 581 to removably fix the capture connector 540 to the circuit board 532 and/or in the chassis 501 of the portion 500 of the computer device 300. In some examples, capture connector 540 may include at least two holes (e.g., each hole being similar to hole 579) each defining a through hole from the top surface 561 to the bottom surface 541 of the capture connector 540. In these examples, each of the at least two holes may interface with a boss or pin on circuit board 532 and/or in the chassis 501 for loading, assembly, and/or aligning purposes. Furthermore, one of the two holes may include a boss without any threads, and the other of the two holes may include a boss with threads. The boss without any threads may be sized for alignment and/or load handling capabilities, and the boss with threads may be sized to retain the capture connector 540.

As such, the fastener 606 may secure the capture connector 540 relative to the circuit board 532 and/or in the chassis 501 of the portion 500 of the computer device 300 in a fixed position. Accordingly, the securing of the capture connector 540 by the fastener 606 also serves to ensure electric connectivity at electrical interfaces 155 and 655, thereby enabling the SM wire 510 to receive an electrical signal from the control components 105.

Referring back to FIG. 4, this portion of locking system 320 includes locking mechanism 504 having one or more members that are movable by the actuator 502 between locked and unlocked states. For example, in this implementation, the locking mechanism 504 includes a first member 512 movable by the SM wire 510, where causes movement by a second member 514, thereby moving the carrier 550 relative to the locking receptacle 340 to engage or disengage the locking protrusion 330 of the other portion (e.g., portion 302 or 304) of computer device 300. In particular, actuation of the SM wire 510 moves the second member 514 from a first position 517 to a second position 519. In an aspect, the second position 519 may be defined by a hardstop switch 506, which may be an example implementation of hardstop 106, with a body defining an electrically conductive surface 508 for detecting contact of the locking mechanism 504 with the hardstop switch 506.

More specifically, the locking mechanism 504 may be actuated by the SM wire 510 (e.g., a nitinol wire) controlled by the processor 112 (and the memory 114) executing the electrical control function 116. For example, the SM wire 510 may be controlled by the actuator 502 to contract, which can cause the first member 512 (e.g., a rocker arm) to forcibly pivot the second member 514 (e.g., a lever arm). In response, the carrier 550 can contact locking protrusion 330 positioned within the aperture 341 of the locking receptacle 340 of portion 500 (e.g., first portion 302 or second portion 304) of the computing device 300, as described in FIGS. 2 and 3. In particular, for example, contact from the first member 512 can cause the second member 514 to pivot on a post 516 and rotate carrier 550 relative to locking receptacle 340 (e.g., away from locking protrusion 330 that may be positioned in the aperture 341 of the locking receptacle 340). The post 516, for example, can be part of or can be fixed to the chassis 501 of the portion 500.

In other words, to achieve an unlocked state of locking mechanism 504, for example, actuator 502 can actuate the locking mechanism 504 to pull first member 512 into second member 514 (e.g., and/or pull first member 512 and second member 514 together where connected), causing the locking mechanism 504 to move from a first position (e.g., in a locked state with carrier 550 extended into the aperture 341 of the locking receptacle 340) towards a second position (e.g., for an unlocked state). In an example, actuator 502 can begin actuation of the locking mechanism 504 to achieve the unlocked state based on a detected event (e.g., activation of a switch or button on the computing device 300, such as a key on a keyboard or other button intended for unlocking and releasing the portion 500 from another portion of the computing device or other device, dock, etc.).

More specifically, in this example implementation, second member 514 may include a side surface 515 that may be driven by the first member 512. With side surface 515 starting in a first position 517 corresponding to the locked state, actuation of actuator 502 pulls the first member 512, causing a rotating action of the second member 514 pivoting on post 516. Actuator 502 can continue actuating the locking mechanism 504 at least until surface 515 of the second member 514 contacts the conductive surface 508 of the hardstop switch 506 at the second position 519 (e.g., corresponding to the unlocked state), which moves carrier 550 at least partially away from (e.g., move partially out of the aperture 341 of) locking receptacle 340. In this example, hardstop switch 506 may have an annular body with parallel top and bottom surfaces, and a substantially perpendicular conductive surface 508 that defines a side surface of hardstop switch 506. Further, in this example, the second member 514 of the locking mechanism 504 may include a planar body having at least one substantially perpendicular side surface defined by surface 515. As such, the contact surface between the conductive surface 508 of hardstop switch 506 and the surface 515 of the second member 514 may define a line, a point, or a rectangular area (e.g., depending on the elasticity of the respective surfaces and bodies), or a curvilinear rectangular surface. It should be understood, however, the locking mechanism 504 and hardstop switch 506 may take any form that allow for electrical conductivity between them, and where the surface 515 of the second member 514 defines a limit of movement, e.g., at least one position, for the locking mechanism 504.

Further, in an example, the post 516 can be coupled to an electrical ground, such as an electrical ground of a chassis 501 of portion 500 such to allow detection of completion of an electrical circuit when the surface 515 of the second member 514 of the locking mechanism 504, which can also be conductive, contacts the conductive surface 508 of the hardstop switch 506 and the signal goes to ground. For example, the post 516 may include a pivot screw that attaches to chassis 501 of the portion 500. Additionally, the post 516 may include or otherwise be coupled to a spring element, such as a wave washer, an electrically-conductive elastomeric material, a spring, etc., under the pivot screw to maintain electrical ground.

Thus, the electrical circuitry 107 of the control components 105 can be electrically connected to hardstop switch 506 to obtain signals therefrom (e.g., such as signals when the electrical circuit is completed at the hardstop switch 506). For example, electrical control function 116 can control actuator 502 and/or detect completion of the electrical circuit at the hardstop switch 506 by communicating signals to/from the actuator 502 and/or the hardstop switch 506 via the circuitry 532. As described, for example, when completion of the electrical circuit is detected at the hardstop switch 506, electrical control function 116 can cause actuator 502 to maintain the actuation of the locking mechanism 504 to hold the locking mechanism 504 in the second position (e.g., the unlocked state, wherein the surface 515 of second member 514 maintains contact with the conductive surface 508 of hardstop switch 506). In an aspect, electrical control function 116 can cause actuator 502 to hold the locking mechanism 504 in the second position for a time period corresponding to an amount of time estimated or allowed for a user to detach portion 500 from another portion (or vice versa).

Further, for example, the processor 112 and/or memory 114 executing electrical control function 116, can supply an electrical signal via one or more electrical circuits the electrical circuitry 107 to the SM wire 510 to cause the SM wire 510 to change shapes. For instance, in this case, the electrical signal applied to the SM wire 510 creates heat due to the internal resistance in the SM wire 510. The generated heat increases a temperature of the SM wire 510 to cause the SM wire 510 to contract, thus actuating the locking mechanism 504, until the locking mechanism 504 contacts the hardstop switch 506. In this example, capture connector 540 holds the ends of the SM wire 510 in a fixed position, and also maintains the electrical connection between the termination components 604 and the contact elements 610, thereby maintaining an electrical connection between the SM wire 510 and the electrical circuitry 107 and the control components 105. As such, the electrical signal generated and controlled by processor 112 and/or memory 114 executing electrical control function 116 may be conducted via the electrical circuitry 107 through the capture connector 540 to the SM wire 510. In addition, in an example, the control components 105 can modulate the electricity supplied to, and hence the temperature of, the SM wire 510 to maintain the SM wire 510 at a substantially constant temperature to cause the SM wire 510 to substantially maintain its present length or shape, such to keep the locking mechanism 504 actuated (e.g., in the unlocked position). As noted above, the control components 105 may maintain actuation of the locking mechanism 504 for a period of time and/or until detection of another event (e.g., activation of a switch or button on the computing device, etc.), at which time the control components 105 may actuate the locking mechanism 504 to enter a locked state, as described below.

To achieve a locked state of locking mechanism 504, for example, the control components 105 and/or the actuator 502 can actuate the locking mechanism 504 to cause first member 512 to be pulled away from the second member 514, which may cause second member 514 to pivot on post 516 such to lower the carrier 550 of the locking mechanism 504 further into the aperture 341 of the locking receptacle 340. In other words, moving to the locked state, in this example, involves movement of the locking mechanism 504 from a second position to a first position, e.g., corresponding to movement of the surface 515 of the second member 514 from the second position 519 to the first position 517. Moreover, in the locked state, the locking mechanism 504, and more specifically the carrier 550, can contact locking protrusion 330 when the locking protrusion 330 enters the aperture 341 of the locking receptacle 340, as described above. In this aspect, for instance, the carrier 550 may engage the locking protrusion 330 to create a force fit within the aperture 341 of the locking receptacle 340. In this example, the actuator 502 may further include the spring element 518 coupled to the first member 512 such that the spring element 518 expands (e.g., stretches) when the first member 512 is pulled into the second member 514. Accordingly, when the actuator 502 begins to release the contraction of the SM wire 510 (e.g., expand the SM wire 510), the spring force of the expanded spring element 518 can cause the first member 512 to return to a first position and push the second member 514 to pivot on the post 516 (e.g., so that the locking protrusion defined by carrier 550 lowers further into the aperture 341 of the locking receptacle 340, and/or until a portion of the first member 512 or the second member 514 contacts a limiting surface 521 on the chassis 501 or locking receptacle 340 connected to the chassis 501). As such, the spring element 518 generates a spring force that causes tension in the SM wire 510 even while in the first position. In this case, the spring force transferred to each termination component 604 and, hence, provides a force normal to the first contact surface 611 of each contact element 610. In any case, the actuator 502 causes movement of the locking mechanism 504 that moves the surface 515 of the second member 514 from the second position 519 to the first position 517. For example, the actuator 502 can control the electrical signal to the SM wire 510 (e.g., remove electricity causing the heat), and thus lower a temperature of the SM wire 510, to cause expansion of the SM wire 510 by removing the contraction force of the actuated SM wire 510 that opposes the spring force of the spring element 518. This can cause the stretched spring element 518 to compress and pull the first member 512 against an opposing surface of the second member 514, causing the second member 514 to pivot on post 516 and move away from the hardstop switch 506.

Figure 7:
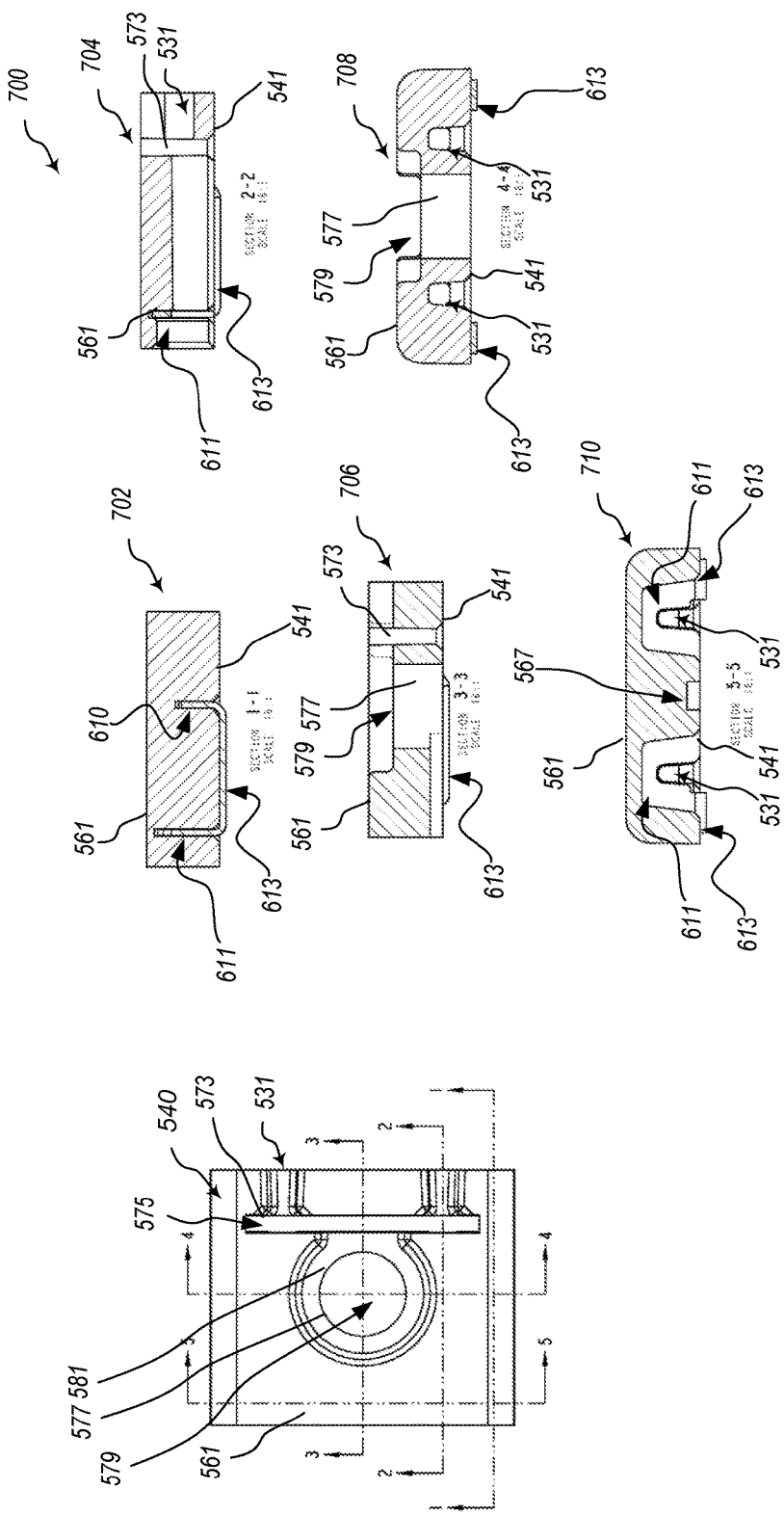
FIG. 7 is a set of partial cross-sectional side views of an example capture connector, in accordance with aspects described herein.

FIG. 7 is a set of partial cross-sectional side views 700 of an embodiment of a capture connector 540 in an undocked configuration. FIG. 7 includes partial cross-sectional side views 702, 704, 706, 708, and 710 of the embodiment of the capture connector 540 in FIG. 4. Cross-sectional side view 702 corresponds to a view of Section 1-1 of capture connector 540. Cross-sectional side view 704 corresponds to a view of Section 2-2 of capture connector 540. Cross-sectional side view 706 corresponds to a view of Section 3-3 of capture connector 540. Cross-sectional side view 708 corresponds to a view of Section 4-4 of capture connector 540. Cross-sectional side view 710 corresponds to a view of Section 5-5 of capture connector 540. Referring generally to FIG. 7, a more detailed view and explanation of the cross-sectional views of capture connector 540 is explained below.

As discussed above, the capture connector 540 includes a body at least partially defined by the bottom surface 541, an opposing top surface 561, and one or more one side walls. Referring to cross-sectional side views 706 and 708, capture connector 540 may include an inner wall 573 extending between the bottom surface 541 and the top surface 561, thereby defining a through hole 575 through which the SM wire 510 may extend. For instance, the through hole 575 may cooperate with the channels 531 to enable the SM wire 510 to threaded through the through hole 575 and oriented with the channels 531, thus providing the capture connector 540 with a configuration that allows easy assembly of the actuator 502 and that envelops the SM wire 510 while allowing the SM wire 510 to move freely within the channels 531. Further, the capture connecter 540 may include an inner wall 577 defining a through hole 579 from the top surface 561 to the bottom surface 541 of the capture connector 540. The through hole 579 is sized to interface with a supportive boss on chassis 501. Additionally, as shown in cross-sectional views 702, 704, and 710, capture connector 540 may include at least one contact element 610, each contact element 610 including a first contact surface 611 and a second contact surface 613.

It should be noted that the above implementations should not be construed as limiting. It is to be appreciated that the capture connector 540, 700, etc. can be of substantially any shape/profile.

Referring back to FIGS. 2 and 3, a secure connection between the first portion 302 and the second portion 304 may include one or more of: a minimal gap between the first portion 302 and the second portion 304, a secure lock, minimal free play (i.e., backlash) about θx (e.g., about the axis extending between the connection of the first portion 302 and second portion 304), minimal free play (i.e., backlash) in the y-direction (e.g., along the axis from the top to the bottom of the first portion 302). In addition or in the alternative, in some embodiments it may be desirable for the insertion force required to insert the locking protrusion 330 into the locking receptacle 340 (including a lock, such as a rotating lock 860 of FIGS. 8-1, 8-2, and 8-3, as described below, and/or other locking components) to be minimal. In additional or alternative embodiments, it may be desirable to provide one or elements of a secure connection (e.g., a minimal gap, a secure lock, minimal free play about θx, minimal free play in the y-direction) and/or minimal required insertion force with minimal numbers of locking elements (e.g., locking protrusions 330) in each locking receptacle 340. For example, it may be desirable that only two locking elements be abutting (e.g., one locking protrusion 330 within a single locking receptacle 340).

In at least one embodiment, the gap (e.g., the distance in the y-direction between the first portion 302 and the second portion 304) between the first portion 302 and the second portion 304 in the docked configuration can be less than 0.1 mm. Having a gap less than 0.1 mm may be desirable for aesthetic and/or functional reasons. For example, for the electrical connection on the electrical protrusions 308 and the electrical connection on the electrical receptacles 309 to remain in contact, the gap should be small. In at least one embodiment described herein, a gap of 0.1 mm may be achieved while providing free play about θx of less than 1.5 degrees. The gap may be dependent on the type of locking system 320 used and/or the tolerances (e.g., the differences in the actual dimensions from the desired dimensions of the design) designed into the locking components of the locking system 320.

A secure lock can be the resistance of the locking system 320 to forces applied in the y-direction. For example, a secure lock may resist movement between the first portion 302 and the second portion 304 when a tension force is applied between the first portion 302 and the second portion 304. In some embodiments, the tension force may be resisted without losing electrical communication between the first portion 302 and the second portion 304. In some embodiments, the tension force may be resisted without plastically deforming locking components of the locking system 320. In some embodiments, the first portion 302 and the second portion 304 may be parallel (e.g., when the y1 and y2 axes are parallel). In other embodiments, the first portion 302 and the second portion 304 may be limited in rotation about θx.

In at least one embodiment, a single locking system 320 can be capable of resisting a tensile force of 57 millinewtons or less applied to the locking system 320 in the y-direction without moving (e.g., less than one micron of movement) in the y-direction. In at least one embodiment, a single locking system 320 can be capable of resisting a tensile force of 4 Newtons or less applied to the locking system 320 in the y-direction without substantial movement (e.g., less than 75 microns of movement) in the y-direction. In at least one embodiment, one locking protrusion 330 and one locking receptacle 340 can be capable of resisting a tensile force of 70 Newtons or less applied to the locking system 320 in the y-direction with minimal movement (e.g., less than 1 mm of movement) in the y-direction. In embodiments where magnets 322 are used, then there would be substantially no movement (e.g., not one or less than one micron of movement) in the y-direction until the force applied by the magnet 322 is overcome. For example, if the magnet 322 applied 16 Newtons of force in the y-direction, then, in at least one embodiment, a single locking protrusion 330 and locking receptacle 340 combination can be capable of resisting 16 Newtons force with no movement (e.g., not one micron of movement), 4 Newtons of force without substantial movement (e.g., less than 75 microns of movement), and 70 Newtons of force with minimal movement (e.g., less than 1 mm of movement) in the y-direction.

Free play (i.e., backlash) about θx is movement of the locking receptacle 340 with respect to the locking protrusion 330 in the θx direction when a force is applied to cause motion about the x-axis. For example, the top of the first portion 302 is pushed with a small force (e.g., 1 Newton), the free play of the entire computing device 300 is the amount of angular displacement (θx) about the hinge. It should be noted that the applied force and/or the free play about θx may be in either direction (e.g., in the positive or negative z-direction or θx direction). Thus, it may be desirable, in some embodiments, to reduce the amount of free play of the locking protrusion 330 about θx. The free play of the locking protrusion 330 about θx is different than the free play of the computing device 300 about θx. For example, the free play of the computing device 300 about θx may include the compliance of the entire first portion 302 (e.g., the materials that form the first portion), compliance of the entire second portion 304, and compliance and/or free play of a hinge as well as the locking protrusion 330. The free play of the locking protrusion 330 about θx is limited only to the components of the locking protrusion 330, locking receptacle 340, other locking elements of locking system 320 or combinations thereof.

In at least one embodiment, the free play about θx of the locking protrusion 330 is small. For example, in at least one embodiment, the free play about θx may be small (e.g., less than 1.5 degrees) when a 200 N-mm torque is applied in the positive or negative θx-direction. In at least one embodiment, the free play about θx may be minimal (e.g., less than 1 degree) when a 200 N-mm torque is applied in the positive or negative θx-direction. In at least one embodiment, the free play about θx may be substantially zero (e.g., less than 0.5 degrees) when a 200 N-mm torque is applied in the positive or negative θx-direction. In at least one embodiment, the free play about θx may be zero (e.g., less than 0.1 degrees) when a 200 N-mm torque is applied in the positive or negative θx-direction.

Free play (i.e., backlash) in the y-direction of the locking protrusion 330 is movement in the y-direction when a tensile force is applied in the y-direction. For example, the top of the first portion 302 and/or the bottom of the second portion 304 are pulled with a small force (e.g., 1 Newton), the free play of the locking protrusion 330 in the y-direction is the distance between the first portion 302 and the second portion 304. Free play in the y-direction differs from the gap described above in that free play in the y-direction is the static distance between the first portion 302 and the second portion 304 when locked. Free play in the y-direction is the distance that the first portion 302 and the second portion 304 are separated by when a small force (e.g., 1 Newton) is applied in the y-direction. In some embodiments, free play in the y-direction may interrupt electrical communication between the first portion and the second portion. In further embodiments, free play in the y-direction may affect the user experience. Thus, it may be desirable, in some embodiments, to reduce the amount of free play of the locking receptacle 340 with respect to the locking protrusion 330 in the y-direction. For example, in at least one embodiment, a single locking protrusion 330 can be capable of limiting travel to less than 75 microns of movement in the y-direction when a tensile force of 4 Newtons or less applied to the locking system 320 in the y-direction.

In at least one embodiment, the free play of the locking protrusion 330 in the y-direction is small (e.g., less than 0.5 mm) when a 1 Newton tensile force is applied in the y-direction. In at least one embodiment, the free play in the y-direction may be substantially zero (e.g., less than 18 microns) when a 1 Newton tensile force is applied in the y-direction. In at least one embodiment, the free play in the y-direction may be zero (e.g., less than 5 microns) when a 1 Newton tensile force is applied in the y-direction. In some embodiments, the free play in the y-direction may be less than between 5 microns and 0.5 mm.

The insertion force is the force required to insert the locking protrusion 330 into the locking receptacle 340. The insertion force is the force applied and can be exclusive of the force of gravity (e.g., the weight of the first portion 302) and/or magnetic forces (e.g., in embodiments that include magnets 322). The insertion force required to insert the locking protrusion 330 into the locking receptacle 340 such that the locking protrusion 330 is locked within the locking receptacle 340 may be sufficient to overcome friction between the locking protrusion 330 and the locking receptacle 340, to overcome forces applied against the locking protrusion 330 by other locking components (e.g., a rotating lock), other forces, or combinations thereof. In at least one embodiment, the insertion force applied may be small (e.g., less than 15 Newtons). In at least one embodiment, the insertion force may be very small (e.g., less than 6 Newtons). In at least one embodiment, the insertion force may be minimal (e.g., less than 2 Newtons). In at least one embodiment, the insertion force may be substantially zero (e.g., less than 1 Newton).

In embodiments where magnets 322 are used, the insertion force may be nearly zero (e.g., no force applied in the y-direction). For example, if the force applied by the magnet 322 in the y-direction is 16 Newtons (8 Newtons per magnet with two magnets) and the insertion force required may be 15 Newtons, the magnet 322 can actually pull the first portion 302 toward the second portion 304. In another example, where the first portion 302 and the second portion 304 are isolated such that the no forces are applied in the y-direction (e.g., the first portion 302 and the second portion 304 are placed in a mandrel) the magnetic force from the magnet 322 may pull the first portion 302 and the second portion 304 into the docked configuration before the locking protrusion 330 comes into contact with the locking receptacle 340. In other words, when the locking protrusion 330 is sufficiently close to the locking receptacle 340, the magnetic force of the magnet 322 may pull the locking protrusion 330 into the locking receptacle 340 without any other forces being needed.

In at least one embodiment described herein, the connection between a single locking protrusion 330 and a single locking system 320 can have a gap between the first portion 302 and the second portion 304 of less than 0.1 mm, is able to lock the first portion 302 to the second portion 304 while maintaining an electrical connection and allowing no more than 0.5 mm of motion under a tensile force of 28 Newtons, is capable of resisting a tensile force of 200 Newtons without separating the locking protrusion 330 from the locking receptacle 340, is capable of resisting a tensile force of 4 Newtons without moving more than 75 microns, has free play about θx of less than 0.1 degrees about the x-axis when a 200 N-mm torque is applied in the positive or negative θx-direction, has free play in the y-direction of less than 18 microns when a 1 Newton tensile force is applied in the y-direction, has a required insertion force of less than 5 Newtons in the y-direction, while only two locking elements abut within a single locking receptacle 340.

In at least one embodiment described herein, the connection between a single locking protrusion 330 and a single locking receptacle 340 has a gap between the first portion 302 and the second portion 304 of less than 0.5 mm, is capable of resisting a tensile force of 100 Newtons without separating the locking protrusion 330 from the locking receptacle 340, is capable of resisting a tensile force of 2 Newtons without moving more than 75 microns, has free play about θx of less than 1.5 degrees about the x-axis when a 200 N-mm torque is applied in the θx-direction, has free play in the y-direction of less than 500 microns when a 1 Newton tensile force is applied in the y-direction, has a required insertion force of less than 15 Newtons in the y-direction.

Although specific combinations of the various components of a secure connection (with or without specific insertion force values and/or specific numbers of locking components) are provided, any permutation of the various components of a secure connection (with or without specific insertion force values and/or specific numbers of locking components) are contemplated as being a part of the present disclosure. For example, at least one embodiment disclosed herein may only be capable of one of: having a gap between the first portion 302 and the second portion 304 of less than 0.5 mm, is capable of resisting a tensile force of 100 Newtons without separating the locking protrusion 330 from the locking receptacle 340, is capable of resisting a tensile force of 2 Newtons without moving more than 75 microns, resisting a tensile force of 28 Newtons without moving more than 0.5 mm, has free play about θx of less than 1.5 degrees about the θx-axis when a 200 N-mm torque is applied in the θx-direction, having free play in the y-direction of less than 500 microns when a 1 Newton tensile force is applied in the y-direction, having a required insertion force of less than 15 Newtons in the y-direction. In another example, at least one embodiment disclosed herein may only be capable of one of: having a gap between the first portion 302 and the second portion 304 of less than 0.1 mm, is capable of resisting a tensile force of 200 Newtons without separating the locking protrusion 330 from the locking receptacle 340, is capable of resisting a tensile force of 4 Newtons without moving more than 75 microns, resisting a tensile force of 56 Newtons without moving more than 0.5 mm, has free play about θx of less than 0.1 degrees about the θx-axis when a 200 N-mm torque is applied in the θx-direction, having free play in the y-direction of less than 75 microns when a 4 Newton tensile force is applied in the y-direction, having a required insertion force of less than 5 Newtons in the y-direction.

Thus, at least one embodiment described herein may meet only one of the disclosed ranges and/or values described herein for a secure connection while failing to meet the other disclosed ranges and/or values described herein (with or without specific insertion force values and/or specific numbers of locking components). At least one embodiment disclosed herein may meet two or more of the disclosed ranges and/or values described herein for a secure connection while failing to meet the other disclosed ranges and/or values described herein (with or without meeting specific insertion force values and/or specific numbers of locking components). Thus, every permutation of these values are considered a part of this disclosure.

Returning to the description of FIGS. 2 and 3, in other embodiments, computing components on the first portion 302 may be in electronic communication with computing components on the second portion 304 via a wireless connection. For example, the first portion 302 may include a wireless receiver (not shown) and the second portion 304 may include a wireless transmitter (not shown) (or vice versa). In another example, both the first portion 302 and the second portion 304 may include a wireless transmitter and a wireless receiver (e.g., wireless transceivers).

Additionally, the locking protrusions 330, in the illustrated embodiment, may include a planar upper surface and a planar lower surface. The locking protrusions 330 may have rounded (e.g., chamfered) edges, for example.

The apertures 341 of the locking receptacles 340 on the first portion 302 are shown as being rounded on their front (e.g., in the z-direction) edges. In other embodiments, the apertures 341 of the locking receptacles may be rounded on their bottom (e.g., in the negative z-direction) edges. In further embodiments, the aperture 341 locking receptacle 340 may have an elongate rectangular shape. However, in embodiments where the locking receptacle 340 has an elongate rectangular shape, the locking protrusion 330 may be more likely to become bound within the locking receptacle 340. For example, when a locking protrusion 330 does not have much space within its corresponding locking receptacle 340, any twist about the y- or x-axis may bind the locking protrusion 330 in the locking receptacle 340. In order to prevent binding, a user would need to pull toward the bottom without significant rotation. However, by providing a few degrees of twist about the y-axis, some rotation may be possible without binding the locking protrusion 330 within the locking receptacle 340.

Figures 1, 8:
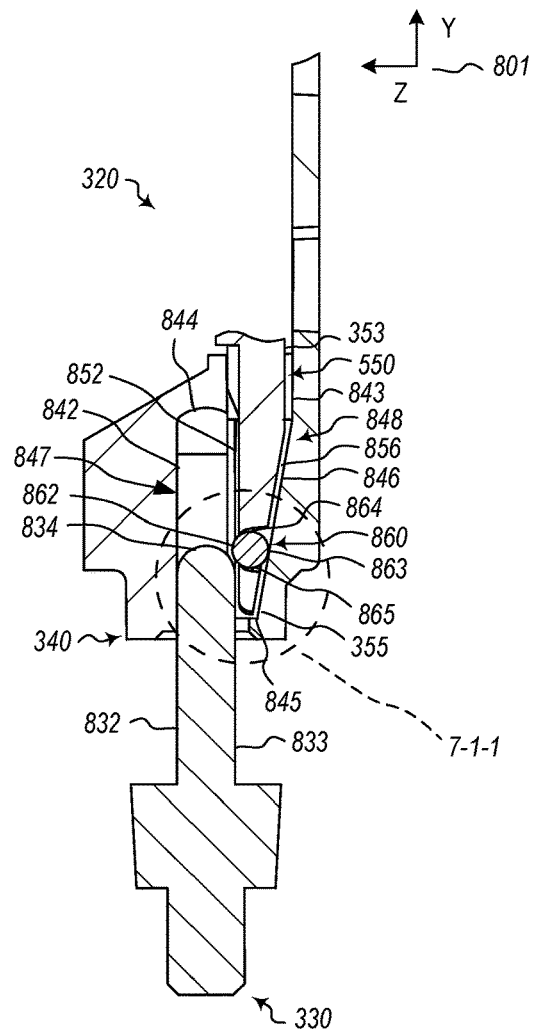
Figures 1, 8:
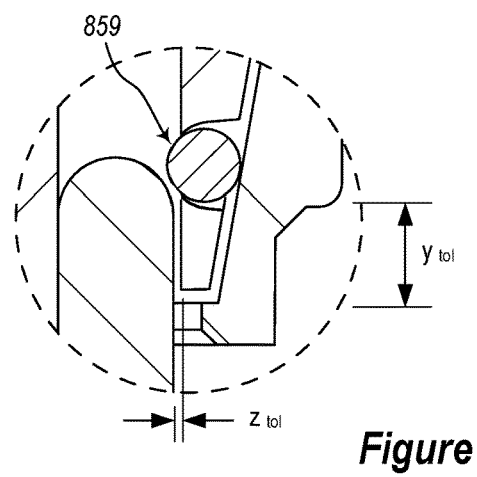
Figures 2, 8:
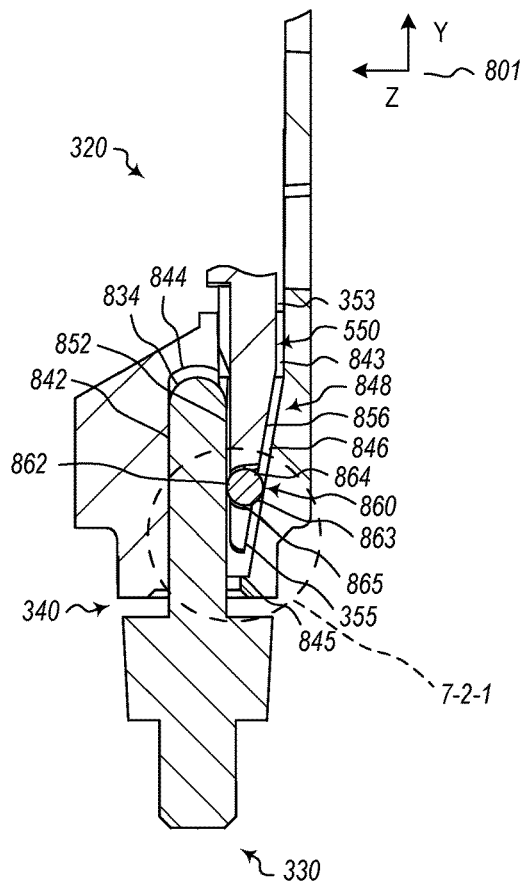
Figures 1, 2, 8:
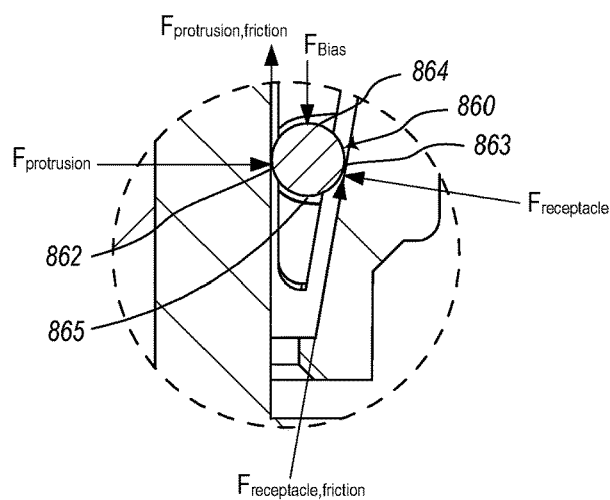
Figures 3, 8:
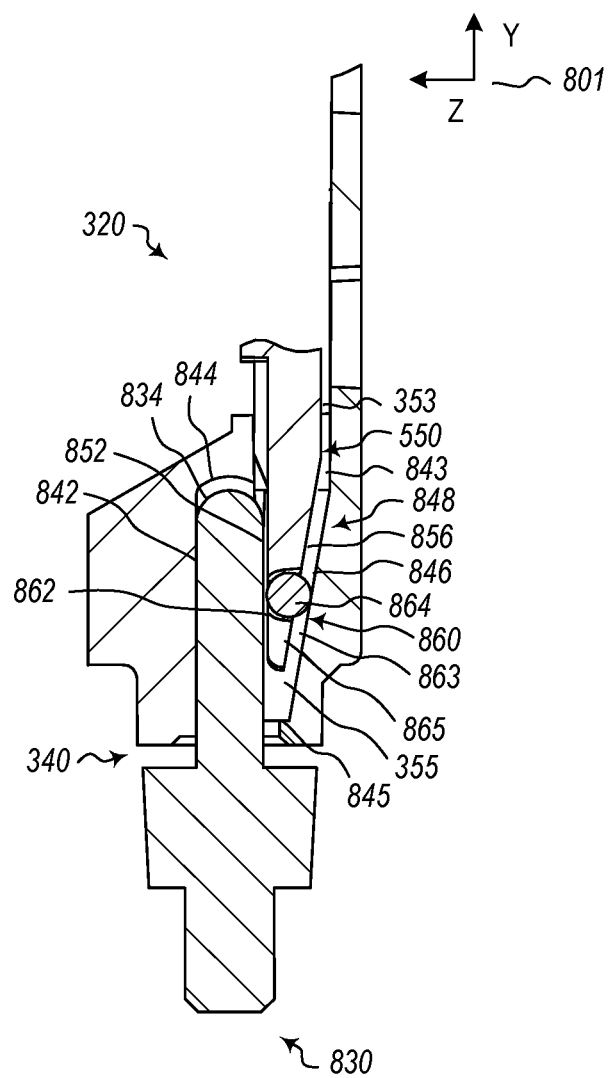

FIG. 8-1 is a partial cross-sectional side view of an embodiment of a locking system 320 in an undocked configuration. FIG. 8-2 is a partial cross-sectional side view of the embodiment of the locking system 320 in FIG. 8-1 in a locked configuration (e.g., docked and locked configuration). FIG. 8-1-1 corresponds to a view of area 8-1-1 in FIG. 8-1. FIG. 8-2-1 corresponds to a view of area 8-2-1 in FIG. 8-2. FIG. 8-3 is a partial cross-sectional side view of the embodiment of a locking system 320 in FIG. 8-1 in an unlocked configuration (e.g., docked, but unlocked configuration). Referring generally to FIGS. 8-1, 8-2, and 8-3, a more detailed view and explanation of the interaction of carrier 550 of locking mechanism 504 and locking protrusion 330 is explained below.

As discussed above, the locking mechanism 504 may include carrier 550, which may include a front surface 852, a back surface 353, a top surface 854, a bottom surface 355, and a tapered surface 856. The carrier 550 may include a rotating lock aperture 859 that is configured to engage the rotating lock 860. The locking protrusion 330 may include a front surface 832, a back surface 833, and a top surface 834. The locking receptacle 340 may include a front surface 842, a back surface 843, a top surface 844, a bottom surface 845, a tapered surface 846, a locking protrusion portion 847 (e.g., the portion of the locking receptacle 340 into which the locking protrusion 330 may be inserted), and a carrier portion 848 (e.g., the portion of the locking receptacle 340 into which the carrier 550 may be inserted).

The locking protrusion portion 847 of the locking receptacle 340 may be sized and/or configured to receive the locking protrusion 330. The carrier portion 848 of the locking receptacle 340 may be sized and/or configured to receive the carrier 550. The front surface 842 of the locking receptacle 340 may be sized and oriented to abut the front surface 832 of the locking protrusion 330. The back surface 843 of the locking receptacle 340 may be sized and oriented to abut the back surface 353 and/or bottom surface 355 of the carrier 550. The top surface 844 of the locking receptacle 340 may be configured to abut the top surface 834 of the locking protrusion 330 in a locked configuration. The bottom surface 845 of the locking receptacle 340 may be configured to engage the bottom surface 355 of the carrier 550. The tapered surface 846 of the locking receptacle 340 may be configured to engage the tapered surface 856 of the carrier 550.

The tapered surface 846 of the locking receptacle 340 is angled relative to the back surface 843 of the locking receptacle 340. The angle may be determined by $2 \times \tan^{-1}(-2)\mu$, where $\mu$ is the coefficient of friction of the material of the tapered surface 846 of the locking receptacle 340. For example, the coefficient of friction, $\mu$, of steel is 0.1, thus the angle of the tapered surface 846 may be less than 11.4 degrees. The illustrated angle is ten degrees.

The rotating lock 860 may rotate about an axis. Examples of rotating locks include a sphere, a spheroid, a cylinder, a gimbal, a cam, other rotating locks, or combinations thereof. The rotating lock 860 may include a front surface 862, a back surface 863, a top surface 864, and a bottom surface 865. Although described in terms of front and back surfaces 862, 863, as the rotating lock 860 rotates the front surface 862 may no longer be the "front". In other words, as the front surface 862 rotates one-hundred and eighty degrees, the front surface 862 is now in the same rotational position as the back surface 863 before rotation began. Thus, for ease of description, the front surface 862 is the portion of the outer surface of the rotating lock 860 that is closest to the back surface 833 of the locking protrusion 330, the back surface 863 is the portion of the outer surface of the rotating lock 860 that is closest to the back surface 843 of the locking receptacle 340, the top surface 864 is the portion of the outer surface of the rotating lock 860 that is closest to the top (e.g., in the y-direction) of the locking system 320, and the bottom surface 865 is the portion of the outer surface of the rotating lock 860 that is closest to the bottom (e.g., in the negative y-direction) of the locking system 320.

In the undocked configuration shown in FIG. 8-1, the locking protrusion 330 has not yet been inserted into the locking protrusion portion 847 of the locking receptacle 340. In this undocked configuration, at least a portion of the carrier 550 may be inserted into the carrier portion 848 of the locking receptacle 340. The carrier 550 may be biased toward the bottom surface 845 and into the carrier portion 848 of the locking receptacle 340 by, for example, spring element 518.

In some embodiments, the carrier 550, may abut a stop surface. The locking receptacle 340 may include a stop surface that limits movement of the carrier 550 toward the bottom of the locking system 320. For example, a portion of the carrier 550 may abut a top facing (e.g., in the y-direction) surface of the locking receptacle 340. When the carrier 550 abuts a top facing surface (e.g., the top surface 844, the bottom surface 845, the tapered surface 846, or combinations thereof of the locking receptacle 340), the carrier 550 may be in its bottom-most position. When the carrier 550 is in its bottom-most position, the rotating lock 860 may be in its top-most (e.g., in the y-direction) and front-most (e.g., in the z-direction) position, as well.

The front surface 862 of the rotating lock 860 may extend at least partially into the locking protrusion portion 847 of the locking receptacle 340 in the undocked configuration. As can be seen in FIG. 8-1, the front surface 862 of the rotating lock 860 extends forward (e.g., in the z-direction) beyond a plane (not shown) of the back surface 833 of the locking protrusion 330. Thus, as the locking protrusion 330 is inserted into the locking receptacle 340, the top surface 834 of the locking protrusion 330 may contact the rotating lock 860 (e.g., the front surface 862 and/or the bottom surface 865 of the rotating lock 860).

The tapered surface 846 of the locking receptacle 340 may abut the bottom surface 865 of the rotating lock 860. The tapered surface 846 may be substantially planar (e.g., flat), such that the rotating lock 860 may rotate (e.g., roll) between the bottom surface 845 and the back surface 843 of the locking receptacle 340.

In embodiments where a rotating lock 860 is used, the rotating lock 860 may act as a tolerance capacitor. In other words, the rotating lock 860 may allow a relaxation of tolerance requirements for other components of the locking mechanism. In other words, the rotating lock 860, as shown in FIG. 8-1-1, may have a tolerance capacity in the z-direction and a tolerance capacity in the y-direction. For example, in the z-direction, the thickness from the front surface 832 to the back surface 833 of the locking protrusion 330 may have a nominal value and a tolerance, the width in the z-direction of the locking protrusion portion 847 of the locking receptacle 340 may have a nominal value and a tolerance, the maximum width (e.g., at the bottom of the tapered surface 856) of the carrier 550 may have a nominal value and a tolerance, the maximum width (e.g., at the bottom of the tapered surface 846) of the carrier portion 848 of the locking receptacle 340 may have a nominal value and a tolerance, the minimum width (e.g., at the top of the tapered surface 856) of the carrier 550 may have a nominal value and a tolerance, the minimum width (e.g., at the top of the tapered surface 846) of the carrier portion 848 of the locking receptacle 340 may have a nominal value and a tolerance, and the diameter of the rotating lock 860 may have a nominal value and a tolerance. However, one or more of the tolerance values may be reduced due to the tolerance capacity in the z-direction provided by the rotating lock 860.

In another example, the tolerances of the locking protrusion 330, the locking receptacle 340, and the rotating lock 860 in the z-direction may determine the locked position (e.g., the position where front surface 862 of the rotating lock 860 first abuts the back surface 833 of the locking protrusion 330) of the rotating lock 860 in the y-direction. Thus, the locked position of the rotating lock 860 may be independent of its position in the y-direction and/or of the y-tolerances and/or z-tolerances to the extent that the rotating lock 860 is able to move in the positive and negative y-direction. In the illustrated embodiment, the rotating lock 860 may move plus or minus 0.5 mm, which soaks up about plus or minus 0.16 mm of tolerances from the locking protrusion 330, the locking receptacle 340, and the rotating lock 860 in the z-direction.

In some embodiments, the tolerances of these various dimensions may be very small in order to prevent binding of the locking components within the locking receptacle 340. However, the rotating lock 860 may allow a relaxation (e.g., an increase in) at least one of the various tolerances. This is due to the fact that the only requirement for the rotating lock 860 to lock the locking protrusion 330 in the locking receptacle 340 is for the rotating lock 860 to be properly seated (e.g., be positioned at least partially into the locking protrusion portion 847 of the locking receptacle 340) such that the front surface 862 of the rotating lock 860 abuts the back surface 833 of the locking protrusion 330.

For example, for an embodiment where the thickness from the front surface 832 to the back surface 833 of the locking protrusion 330 is nominally 1.5 mm with a tolerance of plus or minus 25 microns, the width in the z-direction of the locking protrusion portion 847 of the locking receptacle 340 at the nominal position of the rotating lock 860 is nominally 2.5 mm with a tolerance of plus or minus 65 microns, and the diameter of the rotating lock 860 is nominally 1.0 mm with a tolerance of plus 8 microns or minus 5 microns, the tolerance capacity of the rotating lock 860 in the z-direction may be plus or minus 300 microns. In other words, one or more of the tolerances may be increased by a portion of the tolerance capacity of the rotating lock 860 in the z-direction. In embodiments with a rotating lock 860, all of the tolerances in the z-direction of the locking protrusion 330, the locking receptacle 340, and the rotating lock 860 may be converted into uncertainty of the roller position. In other words, if all the locking components are at their extreme positions, the rotating lock 860 may be at its extreme position. In embodiments where the thickness of the computing device (e.g., computing device 300) is limited, the tolerances in the thickness direction (e.g., the z-direction) may be very small. However, if the computing device has space in other directions (e.g., the y-direction), the rotating lock 860 may soak up the tolerances in the thickness direction and convert them into position uncertainty for the rotating lock 860.

As the locking system 320 transitions from the undocked configuration shown in FIG. 8-1 to the docked configuration shown in FIG. 8-2, the rotating lock 860 moves toward the top (e.g., in the y-direction) of the locking system 320. For example, as the locking protrusion 330 is inserted into the locking receptacle 340, the top surface 834 of the locking protrusion 330 may abut and move the rotating lock 860 toward the top of the locking system 320. As the rotating lock 860 is pushed toward the top of the locking system 320, the rotating lock 860 moves both toward the top (e.g., in the y-direction) and toward the back (e.g., in the negative z-direction) of the locking system 320. As the bottom surface 865 of the rotating lock 860 transitions from contact with the top surface 834 of the locking protrusion 330, the top surface 864 of the rotating lock 860 comes into contact with the back surface 833 of the locking protrusion 330.

In embodiments where the rotating lock 860 is biased toward the bottom surface 845 of the locking protrusion, the forces being applied to the rotating lock 860 are illustrated in FIG. 8-2-1. The biasing force (e.g., a force applied by a biasing mechanism such as a spring) is applied to the top surface 864, which results in the force applied by the locking receptacle 340 (e.g., normal to the tapered surface 846) on the bottom surface 865 of the rotating lock 860 and the force applied by the locking protrusion 330 (e.g., normal to the back surface 833) on the front surface 862 of the rotating lock 860 (ignoring the force of gravity) as well as the force due to the friction (e.g., $\mu*F_{Receptacle}$) of the locking receptacle 340 and the force due to friction (e.g., $\mu*F_{Protrusion}$) of the locking protrusion 330. In other embodiments, the forces applied to the rotating lock may differ. For example, instead of a biasing force, gravity may be used to move the rotating lock 860 toward the bottom of the locking system 320.

In the undocked configuration shown in FIG. 8-1, the rotating lock 860 may be housed by the rotating lock aperture 859 of the carrier 550. The rotating lock aperture 859 may couple movement of the rotating lock 860 with the carrier 550 in at least one direction. For example, as shown in FIG. 8-1, the rotating lock aperture 859 may couple movement of the rotating lock 860 in the top and bottom (e.g., in the y-direction) directions. As shown, the rotating lock aperture 859 may limit movement in the front and back (e.g., in the z-direction) direction of the rotating lock 860. For example, the rotating lock aperture 859 may be shaped to correspond with at least a portion of the shape of the rotating lock 860. As shown, an inner surface of the rotating lock aperture 859 may be curved internally in a front portion and/or a back portion to correspond with an outer surface of the rotating lock 860. In embodiments where the front surface 852 of the carrier 550 abuts with a back facing surface in the carrier portion 848 of the locking receptacle, the front surface 852 of the carrier 550 may combine with the rotating lock aperture 859 to limit movement in the front and back direction of the rotating lock 860.

In embodiments without a carrier 550, the rotating lock 860 may abut a back facing surface in the carrier portion 848 to allow only a portion of the rotating lock 860 to enter the locking protrusion portion 847 of the locking receptacle 340. For example, the rotating lock 860 may be shaped such that a left and/or right portion of the rotating lock 860 has a smaller dimension in the front and back direction than a middle portion (e.g., between the left and right portions) of the rotating lock 860, such that the middle portion still extends, at least partially, into the locking protrusion portion 847 of the locking receptacle 340 when another portion (e.g., the left and/or right portion) is prevented from doing so.

The top surface 834 of the locking protrusion 330 and the top surface 844 of the locking receptacle 340 are illustrated with complementary rounded, convex faces. In other embodiments, the top surface 834 of the locking protrusion 330 and/or the top surface 844 of the locking protrusion may be otherwise shaped (e.g., complementary, not complementary, rounded, not rounded, convex, concave, or combinations thereof).

To transition from the locked configuration shown in FIG. 8-2, a force must be applied to the carrier 550 to retract the rotating lock 860. As the carrier 550 is transitioned from the locked configuration toward the unlocked configuration, the tapered surface 856 of the carrier 550 may cease to contact the tapered surface 846 of the locking receptacle 340. In the illustrated embodiment, at least the portion of the carrier 550 that fits into the carrier portion 848 of the locking receptacle 340 may be rigid. In other embodiments, at least a portion of the carrier 550 may be elastically deformable such that when the tapered surface 856 of the carrier 550 initially contacts the tapered surface 846 of the locking receptacle, the carrier 550 elastically deforms (e.g., bends) as the carrier 550 advances and returns toward its initial state as the carrier 550 is retracted. Thus, the tapered surface 856 of the carrier 550 may remain in contact with the tapered surface 846 of the locking receptacle 340 as the carrier 550 is retracted.

Once the rotating lock 860 no longer contacts the back surface 833 of the locking protrusion 330, the locking protrusion 330 may be removed. In some embodiments, the first portion 302 and the second portion 304 may stay together in the unlocked configuration. In other embodiments, the locking system 320 may return to the locked/docked configuration of FIG. 8-2 after a predetermined period of time.

Figure 9:
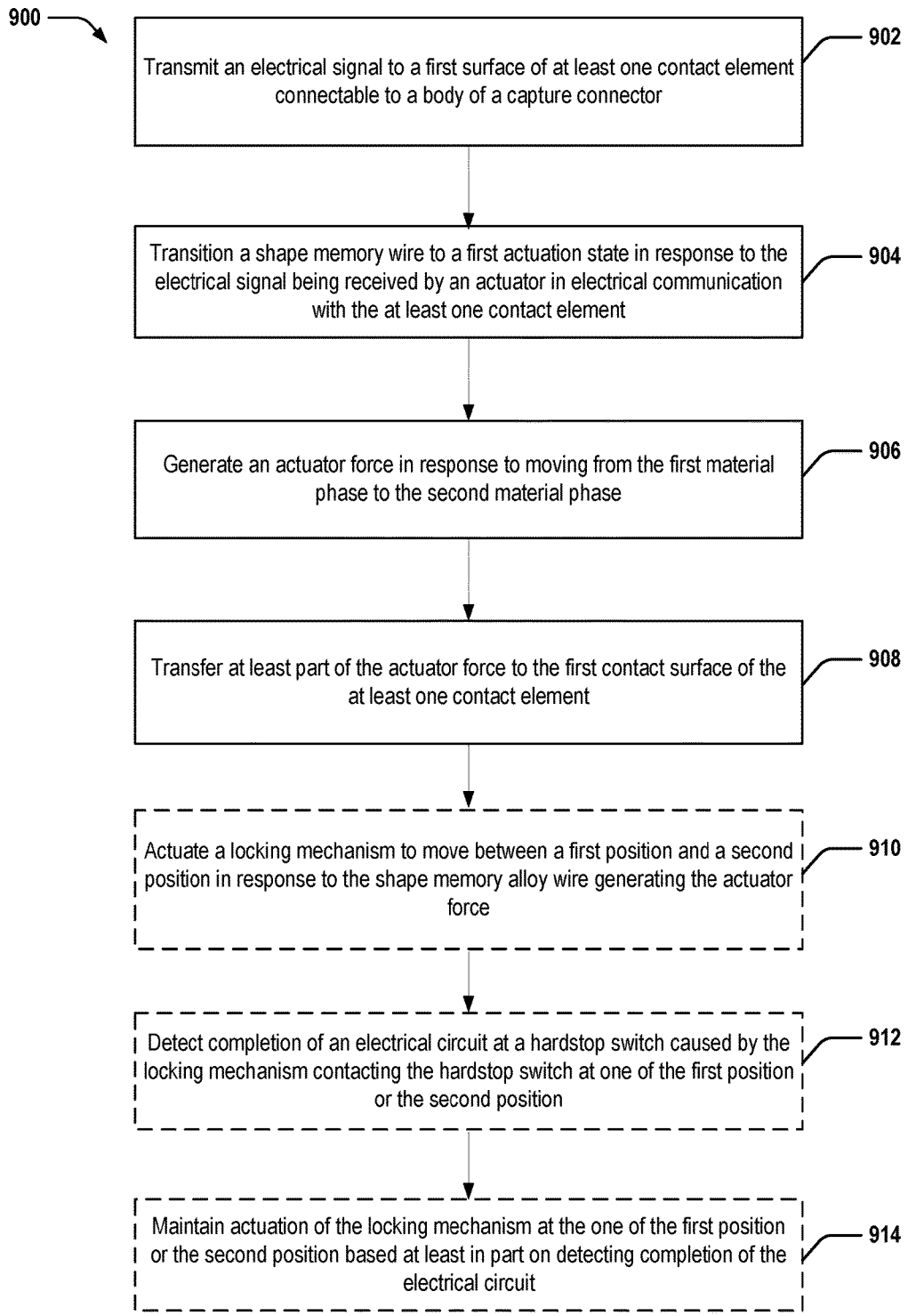
FIG. 9 is a flow diagram of an example of a method for actuating an actuated locking device in accordance with aspects described herein.

Referring to FIG. 9, an example of a method 900 for controlling an actuated locking device in accordance with aspects described herein. For example, method 900 can be performed by actuated locking device 100 (FIG. 1), a device employing actuated locking device 100, etc., and/or specifically electrical control function 116 or other function implemented by processor 112 of actuated locking device 100, a corresponding device, etc., to lock or unlock actuated locking device 100. Similarly, the method 900 may be performed by the computing device 300 including the locking system 320.

At action 902, method 900 includes transmitting, via electrical circuitry, an electrical signal to a first surface of at least one contact element connectable to a body of a capture connector. For example, in an aspect, processor 112 (and/or memory 114) (FIG. 1) executing electrical control function 116 transmits, via electrical circuitry 107, an electrical signal to a first surface of at least one contact element 160 connectable to a body of a capture connector 140 of actuated locking mechanism 100. In particular, electrical control function 116 includes programming code or instructions configured to control movement of the locking mechanism 104 between a locked state and an unlocked state, respectively corresponding to one of the first position 118 and the second position 120. Electrical circuitry 107 may include wiring and/or electrical connections, such as may be defined by a circuit board that includes at least one electrical interface configured to be in contact with a portion of the at least one contact element 160 in order communicate the electrical signal to the SM wire 103. As described further herein, the actuator 102 may include the capture connector 140 and the at least one contact element 160, wherein the contact element 160 is connectable to or positionable against the body of the capture connector 140. Further, each contact element 160 has a first contact surface and a second contact surface. In one example, the at least one electrical interface of the electrical circuitry 107 (e.g., a contact surface on a circuit board) can be positioned to contact the second contact surface of the at least one contact element 160. Furthermore, the first contact surface may extend in a first direction (e.g., perpendicular direction 131 or oblique direction 133) and the second contact surface may extend in a second direction that is different from the first direction, such as but not limited to the second direction 135. In another example, the capture connector 140 may include a fastener (e.g., a screw, a rivet, glue, solder, etc.) that is positionable with respect to the circuit board to connect the second contact surface of the at least one contact element with the at least one electrical interface of the circuit board. The fastener is configured to removably fix the capture connector 140 to the circuit board so that electrical contact between the second contact surface and the electrical interface is maintained. Further, in one example, the transmitting of the electrical signal can be in response to the electrical control function 116 detecting an event for determining to actuate the locking mechanism 104 to move to one of the first position 118 or the second position 120. For example, detecting the event may correspond to detecting activation of a switch or other mechanical or electromechanical feature of an actuated locking device 100, device, etc., and/or the like.

At action 904, the method 900 includes transitioning a shape memory wire to a first actuation state in response to the electrical signal being received at an actuator in electrical communication with the at least one contact element. For example, in an aspect, SM wire 103 (FIG. 1) moves to a first actuation state in response to the electrical signal being received at the actuator 102, which is in electrical communication with the at least one contact element 140 via the termination component 150. As described further herein, the SM wire 103 may extend in direction 135, and may be positioned adjacent to and/or through capture connector 140. In an example, the SM wire 103 has at least one of a first actuation state and a second actuation state. In the first actuation state the SM wire 103 has a contracted shape corresponding to moving from a first material phase to a second material phase, and in the second actuation state the SM wire 103 has an expanded shape corresponding to moving from the second material phase to the first material phase. Furthermore, the termination surface of termination component 150 is positioned for electrical contact with the first contact surface of a respective contact element 160, e.g., at electrical interface 155. In particular, the termination component 150, which may be a barrel crimp, is fixedly coupled to the SM wire 103. Also, the termination surface of the termination component 150, such as a contact surface at an end of the longitudinal body of the barrel crimp, is configured to mate with the first contact surface of content element 160. As such, the termination surface of the termination component 150 may receive the electrical signal communicated to the second contact surface of contact element 160 from the first contact surface of contact element 160 via the electrical interface 155. Thus, the electrical signal is received by the SM wire 103 via the termination component 150, thereby causing the SM wire 130 to heat up due to internal resistance and thereby transitioning the SM wire 103 to the first actuation state.

At action 906, method 900 includes generating an actuator force in the third direction in response to moving from the first material phase to the second material phase. For example, in an aspect, the SM wire 103 (FIG. 1) may contract to generate the actuator force 125 in the third direction (e.g., direction 135) upon actuation by the control components 105.

At action 908, the method 900 includes transferring at least part of the actuator force in the third direction to the first contact surface of the at least one contact element. For example, in an aspect, the termination surface of the at least one termination component 150 (FIG. 1) transfers at least a part of the actuator force 125 to the first contact surface 611 of the at least one contact element 610. In one example, since the first contact surface of the at least one contact element 160 and the termination surface of the termination component 150 substantially lie in a first plane extending in the first direction, which may be direction 131 or direction 133, the actuator force 125 in the third direction (e.g., direction 135) is normal to or oblique to the first plane. Moreover, as the capture connector 140 maintains a fixed position, the electrical contact at electrical interface 155 between the termination surface of the termination component 150 and the first contact surface of the at least one contact element 160 is enhanced due to the actuator force 125 in the third direction. Thus, a solid electrical connection is maintained throughout the duration of the actuation of actuated locking device 100.

At optional (as indicated by dashed lines) action 910, the method 900 includes actuating a locking mechanism to move between a first position and a second position. For example, actuator 102 (FIG. 1), e.g., in conjunction with processor 112, memory 114, electrical control function 116, etc., can actuate a locking mechanism portion (e.g., locking mechanism 104) of actuated locking device 100 to move the locking mechanism 104 between a first position 118 and a second position 120. In particular, the SM wire 103 of the actuator 102 can be actuated between different phases to control locking and unlocking of the locking mechanism 104. As described above and further herein, the locking mechanism 104 can provide a locking and/or unlocking action to lock a first portion of a device to a second portion of the device, unlock the first portion of the device from the second portion of the device, lock/unlock the device to/from another device, such as a similar device, a dock, one or more input devices, etc., and/or the like. In one example, one of the first position 118 or the second position 120 of the locking mechanism 104 may correspond to a locked state and the other one of the first position or the second position of the locking mechanism 104 may correspond to an unlocked state, or vice versa.

At optional action 912, the method 900 may include detecting completion of an electrical circuit at a hardstop switch caused by the locking mechanism contacting the surface of the hardstop switch at one of the first position or the second position 120. For example, hardstop 106 (FIG. 1) may include a conductive surface that adds an electric switch functionality to the hardstop 106. In this case, the hardstop 106 and switch functionality, e.g., in conjunction with processor 112, memory 114, and/or electrical control function 116, may detect completion of the electrical circuit at the hardstop switch (e.g., hardstop 106) caused by the locking mechanism (e.g., locking mechanism 104) contacting the hardstop switch at one of the first position 118 or the second position 120. For example, the locking mechanism 104 may contact a conductive surface of the hardstop 106, which can complete the electrical connection. In an example, locking mechanism 104 may also be composed of an electrically conductive material and may be connected to a system ground of a device (e.g. a chassis ground of the device), such to allow completion of the electrical circuit at the hardstop switch to activate the switch. Processor 112 and/or electrical control function 116 may detect activation of the hardstop switch 106 in this regard. Accordingly, various configurations of the hardstop 106 are possible, examples of which are described herein, as at least a portion of a body the hardstop 106 can be electrically conductive, while the hardstop 106 may not require tolerances typically associated with separate mechanical hardstops and electrical switches.

At optional action 914, the method 900 may include maintaining actuation of the locking mechanism at the one of the first position 118 or the second position 120 based at least in part on detecting completion of an electrical circuit. For example, actuator 102 (FIG. 1), e.g., in conjunction with processor 112, memory 114, and/or electrical control function 116, can maintain actuation of the locking mechanism (e.g., locking mechanism 104) at the one of the first position 118 or the second position 120 based at least in part on detecting completion of the electrical circuit at hardstop 106. As described, for example, where the actuator 102 includes a SM wire 103, maintaining actuation of the locking mechanism 104 may include maintaining a phase or shape of the SM wire 103 by modulating an electrical signal applied to, and hence a temperature of, the SM wire 103 in an attempt to substantially maintain the temperature of the SM wire 103, and thus electrical contact of the locking mechanism 104 to the hardstop 106. In one example, electrical control function 116 and/or actuator 102 may include known electrical signal versus SM wire phase change relationships (e.g., turn the signal on and/or off for certain amounts of time to obtain or maintain a certain amount of phase change) that enable electrical control function 116 via processor 112 to modulate the electrical signal supplied to the SM wire 103 to cause and/or maintain contact of locking mechanism 104 with a conductive surface of hardstop 106. In another example, actuator 102 can increase the temperature of the SM wire 103 when the electrical contact between the locking mechanism 104 and the hardstop 106 begins to degrade or otherwise ceases and electrical control function 116 wants to maintain the electrical contact. Thus, actuation of the locking mechanism 104 can be maintained in this regard. For example, this can cause the locking mechanism 104 to remain in the locked or unlocked state defined by the first position 118 or the second position 120 in which actuation of the locking mechanism 104 is maintained.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Several aspects of an actuated locking device have been described above with reference to various systems and methods. One or more portions of these systems and methods may have been described or illustrated in the accompanying drawings by various blocks, modules, components, circuits, steps, processes, algorithms, etc. (collectively referred to as "elements"). One or more of these elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An actuator mechanism, comprising:
   a capture connector having a body;
   at least one contact element connectable to the body, wherein each contact element comprises a first contact surface extending in a first direction;
   a shape memory element extending adjacent to the capture connector, wherein the shape memory element has at least one of a first actuation state and a second actuation state; and
   at least one termination component fixedly coupled to the shape memory element, wherein the termination component comprises a termination surface positioned to have increased electrical contact with the first contact surface of a respective contact element in one of the first actuation state and the second actuation state as compared to an other one of the first actuation state and the second actuation state.

2. The actuator mechanism of claim 1, wherein in the first actuation state the shape memory element has a contracted shape corresponding to moving from a first material phase to a second material phase, and wherein in the second actuation state the shape memory element has an expanded shape corresponding to moving from the second material phase to the first material phase.

3. The actuator mechanism of claim 1, wherein in at least one of the first actuation state and the second actuation state, the shape memory element generates an actuator force such that the termination surface of the at least one termination component transfers at least part of the actuator force to the first contact surface of the at least one contact element.

4. The actuator mechanism of claim 1, wherein in the one of the first actuation state and the second actuation state, the shape memory element generates an actuator force in a direction that is divergent from the first direction.

5. The actuator mechanism of claim 1, wherein the first contact surface of the at least one contact element and the termination surface of the termination component substantially lie in a first plane extending in the first direction, and wherein in the one of the first actuation state and the second actuation state, the shape memory element generates an actuator force in a direction that is oblique to the first plane.

6. The actuator mechanism of claim 1, wherein the first contact surface of the at least one contact element and the termination surface of the termination component substantially lie in a first plane extending in the first direction, and wherein in the one of the first actuation state and the second actuation state, the shape memory element generates an actuator force in a direction that is substantially normal to the first plane.

7. The actuator mechanism of claim 1, further comprising:
wherein the at least one contact element further comprises a second contact surface extending in a second direction different from the first direction;
a circuit board having at least one electrical interface shaped to contact the second contact surface of the at least one contact element;
wherein the first contact surface of the at least one contact element and the termination surface of the termination component substantially lie in a first plane extending in the first direction; and
wherein the first plane is divergent from a plane of the second contact surface and the electrical interface of the circuit board.

8. The actuator mechanism of claim 7, further comprising:
a fastener positionable with respect to the circuit board to connect the second contact surface of the at least one contact element with the at least one electrical interface of the circuit board.

9. The actuator mechanism of claim 7, wherein the capture connector further comprises a first mating component and the circuit board or a chassis to which the circuit board is mounted comprises a second mating component having a shape corresponding to the first mating component, wherein the first mating component and the second mating component fit together to substantially resist at least one of a relative rotation and a relative translation between the capture connector and the circuit board.

10. The actuator mechanism of claim 1, further comprising:
a locking mechanism connectable to the shape memory element, wherein the locking mechanism has a locked state and an unlocked state each corresponding to a respective one of the first actuation state and the second actuation state of the shape memory element.

11. The actuator mechanism of claim 10, wherein the first contact surface of the at least one contact element includes an inner contact wall defining an opening sized to receive the shape memory element.

12. The actuator mechanism of claim 11, wherein the capture connector includes an inner connector wall defining a channel sized to receive the shape memory element.

13. The actuator mechanism of claim 1, wherein the body of the capture connector includes a top wall and an opposing bottom wall each having an inner wall that defines a through hole in a first plane, wherein the top wall and the bottom wall additionally at least partially define at least one channel through the body in a second plane different from the first plane, wherein the shape memory element is positioned to extend through the at least one channel.

14. The actuator mechanism of claim 1,
wherein the body of the capture connector includes a top wall and an opposing bottom wall that define a through hole in a first plane;
wherein the top wall further at least partially defines at least one bottom-opening channel in the body positioned adjacent to the through hole;
wherein the bottom wall further at least partially defines at least one top-opening channel in the body positioned adjacent to the through hole;
wherein the at least one bottom-opening channel and the at least one top-opening channel are at least partially aligned in a second plane different from the first plane; and
wherein the shape memory element is positioned to extend through the at least one bottom-opening channel, the through hole, and the at least one top-opening channel.

15. A computing device, comprising:
a first portion having a first set of computing components;
a second portion having a second set of computing components, wherein the second portion is removably attachable to the first portion;
a locking mechanism having a locked state and an unlocked state, wherein the locked state corresponds to a fixed attachment of the first portion and the second portion, and wherein the unlocked state corresponds to a release of the fixed attachment of the first portion and the second portion;
an actuator mechanism having a first actuation state and a second actuation state each corresponding to one of the locked state and the unlocked state, wherein the actuator mechanism includes:
a capture connector having a body;
at least one contact element connectable to the body, wherein each contact element comprises a first contact surface extending in a first direction;
a shape memory element extending adjacent to the capture connector, wherein the shape memory element has at least one of a first actuation state and a second actuation state; and
at least one termination component fixedly coupled to the shape memory element, wherein the termination component comprises a termination surface positioned to have increased electrical contact with the first contact surface of a respective contact element in one of the first actuation state and the second actuation state as compared to an other one of the first actuation state and the second actuation state.

16. The computing device of claim 15, wherein in at least one of the first actuation state and the second actuation state, the shape memory element generates an actuator force such that the termination surface of the at least one termination component transfers at least part of the actuator force to the first contact surface of the at least one contact element.

17. The computing device of claim 15, wherein the body of the capture connector includes a top wall and an opposing bottom wall each having an inner wall that defines a through hole in a first plane, wherein the top wall and the bottom wall additionally at least partially define at least one channel through the body in a second plane different from the first plane, wherein the shape memory element is positioned to extend through the at least one channel.

18. A method operating an actuator, comprising:
transmitting, via at least one electrical interface of a circuit board, an electrical signal to a first surface of at least one contact element connectable to a body of a capture connector, wherein the first surface extends in a first direction, wherein a termination surface of at least one termination component is fixedly coupled to a shape memory element; and transitioning the shape memory element to a first actuation state based on the electrical signal transmitted to the first surface, wherein the termination surface is positioned to have increased electrical contact with the first contact surface of a respective contact element in one of the first actuation state and a second actuation state as compared to an other one of the first actuation state and the second actuation state.

19. The method of claim 18, generating, in at least one of the first actuation state and the second actuation state, an actuator force such that the termination surface of the at least one termination component transfers at least part of the actuator force to the first contact surface of the at least one contact element.

20. The method of claim 18, wherein the body of the capture connector includes a top wall and an opposing bottom wall each having an inner wall that defines a through hole in a first plane, wherein the top wall and the bottom wall additionally at least partially define at least one channel through the body in a second plane different from the first plane, wherein the shape memory element is positioned to extend through the at least one channel.

\* \* \* \* \*